(12) United States Patent
Ono et al.

(10) Patent No.: US 8,309,187 B2
(45) Date of Patent: Nov. 13, 2012

(54) OPTICAL FILM, ELLIPTICALLY POLARIZING PLATE, CIRCULARLY POLARIZING PLATE, LIQUID CRYSTAL DISPLAY ELEMENT, AND METHOD OF PRODUCING OPTICAL FILM

(75) Inventors: Yoshiyuki Ono, Yachimata (JP); Kazunori Maruyama, Chiba (JP)

(73) Assignee: DIC Corporation, Tokyo (JP)

( * ) Notice: Subject to any disclaimer, the term of this patent is extended or adjusted under 35 U.S.C. 154(b) by 1469 days.

(21) Appl. No.: 11/793,746

(22) PCT Filed: Dec. 27, 2005

(86) PCT No.: PCT/JP2005/023904
§ 371 (c)(1),
(2), (4) Date: Jun. 22, 2007

(87) PCT Pub. No.: WO2006/077723
PCT Pub. Date: Jul. 27, 2006

(65) Prior Publication Data
US 2008/0036946 A1     Feb. 14, 2008

(30) Foreign Application Priority Data
Dec. 27, 2004   (JP) .............................. 2004-376235

(51) Int. Cl.
*C09K 19/00* (2006.01)
(52) U.S. Cl. .......... 428/1.3; 428/1.1; 428/1.2; 428/1.31; 349/117; 349/119; 349/123
(58) Field of Classification Search .......... 428/1.2–1.33; 349/123–124
See application file for complete search history.

(56) References Cited

U.S. PATENT DOCUMENTS

| | | | |
|---|---|---|---|
| 5,389,698 A | 2/1995 | Chigrinov et al. | |
| 5,539,074 A | 7/1996 | Herr et al. | |
| 5,602,661 A * | 2/1997 | Schadt et al. | 349/124 |
| 5,736,067 A | 4/1998 | Kawata et al. | |

(Continued)

FOREIGN PATENT DOCUMENTS
EP     1209515 A1    5/2002
(Continued)

OTHER PUBLICATIONS

JPO Website Machine English Translation of JP 2004-077719, Morita et al. Mar. 11, 2004.*

(Continued)

*Primary Examiner* — Angela Ortiz
*Assistant Examiner* — Ruiyun Zhang
(74) *Attorney, Agent, or Firm* — Westerman, Hattori, Daniels & Adrian, LLP

(57) ABSTRACT

An optical film 10 of the present invention includes a plurality of optically anisotropic layers 13 which are laminated, wherein the optically anisotropic layer including: a photo-alignment layer (A) 11, in which a liquid crystal aligning capability has been generated by means of photoirradiation; and a polymer layer (B) 12, which contains a liquid crystal compound that has a polymerizable group, and which is obtained by polymerization in a state where it has been aligned by the photoalignment layer (A) 11, wherein the photoalignment layer (A) 11 and the polymer layer (B) 12 are bonded by covalent bonding. The plurality of optically anisotropic layers 13 may be an optically anisotropic layer 13 having a function of a one-half wavelength plate, and an optically anisotropic layer 13 having a function of a one-quarter wavelength plate.

10 Claims, 2 Drawing Sheets

U.S. PATENT DOCUMENTS

| | | | |
|---|---|---|---|
| 5,747,121 A | 5/1998 | Okazaki et al. | |
| 5,863,457 A | 1/1999 | Hasebe et al. | |
| 7,352,678 B2 * | 4/2008 | Ooto | 369/112.22 |
| 2002/0012766 A1 * | 1/2002 | Faris et al. | 428/100 |
| 2002/0034709 A1 | 3/2002 | Fukuda et al. | |
| 2002/0041352 A1 * | 4/2002 | Kuzuhara et al. | 349/117 |
| 2002/0060310 A1 | 5/2002 | Hasebe et al. | |
| 2002/0098295 A1 * | 7/2002 | Yip et al. | 427/487 |
| 2002/0113921 A1 * | 8/2002 | Jiang et al. | 349/96 |
| 2002/0113929 A1 * | 8/2002 | Yamazaki et al. | 349/123 |
| 2002/0118323 A1 * | 8/2002 | Itou et al. | 349/113 |

FOREIGN PATENT DOCUMENTS

| | | |
|---|---|---|
| EP | 1295863 A1 * | 3/2003 |
| EP | 1400838 A1 | 3/2004 |
| JP | 6-289374 A | 10/1994 |
| JP | 7-138308 A | 5/1995 |
| JP | 7-146409 A | 6/1995 |
| JP | 8-3111 A | 1/1996 |
| JP | 8-15681 A | 1/1996 |
| JP | 8-29618 A | 2/1996 |
| JP | 9-152509 A | 6/1997 |
| JP | 7-294735 A | 1/1999 |
| JP | 11-80090 A | 3/1999 |
| JP | 11-148079 A | 6/1999 |
| JP | 2000-178233 A | 6/2000 |
| JP | 2002-131534 A | 5/2002 |
| JP | 2002-145830 A | 5/2002 |
| JP | 2002-250924 A | 9/2002 |
| JP | 2002-308831 A | 10/2002 |
| JP | 2002-317013 A | 10/2002 |
| JP | 2003-270638 A | 9/2003 |
| JP | 2004-20701 A | 1/2004 |
| JP | 2004-077719 A | 3/2004 |
| JP | 2004-077813 A | 3/2004 |
| JP | 2004-139084 A | 5/2004 |

OTHER PUBLICATIONS

JPO Website Machine English Translation of JP 2004-077719, Morita et al., Mar. 11, 2004.*

International Search Report of PCT/JP2005/023904, date of mailing Apr. 18, 2006.

Supplementary European Search Report dated Jun. 7, 2010, issued in corresponding European Patent Application No. 05822849.5.

Korean Office Action dated May 30, 2012, issued in Korean Patent Application No. 10-2007-7015326, with English translation (6 pages).

* cited by examiner

OPTICAL FILM, ELLIPTICALLY POLARIZING PLATE, CIRCULARLY POLARIZING PLATE, LIQUID CRYSTAL DISPLAY ELEMENT, AND METHOD OF PRODUCING OPTICAL FILM

TECHNICAL FIELD

The present invention relates to: an optical film, in which an optically anisotropic layer, which is obtained by polymerizing a polymerizable liquid crystal composition in a state where it is aligned, is laminated; an elliptically polarizing plate; a circularly polarizing plate; a liquid crystal display element that utilizes these optical films; and a production method of the optical film.

BACKGROUND ART

Circularly polarizing plates and elliptically polarizing plates are a combination of optical films, which have a suitable phase difference, on a polarizing plate, and they are used as one member of liquid crystal display devices for the reason that they are essential to the principle of operation of the display, and for the object of solving the problem of viewing characteristics. Since these various circumstances in terms of the visibility are different depending on the method, which is determined by the positional relationship between the light source and the liquid crystal, such as the LCD method (for example, a STN type LCD, a TFT-LCD, an IPS (In-Plane Switching) type LCD, a FLC (Ferroelectric Liquid Crystal) type LCD, an OCB (Optically Compensated Bend) type LCD, a VA (Vertically Aligned) type LCD, an ECB (Electrically Controlled Birefringence) type LCD, a HAN (Hybrid Aligned Nematic) type LCD, a GH (Guest-Host) type LCD, and the like), the transmission type, the reflection type, and the semi-transparent type, circularly polarizing plates and elliptically polarizing plates that are suitable for each method become necessary.

For example, in order to solve the problem in STN type liquid crystal display devices (LCD) wherein the screen becomes colored as a result of the phase difference applied at the time of passing through the crystal, and in order to solve the problem in a TFT-LCD wherein the display color and the display contrast changes depending on the viewing direction, a linearly polarizing plate and an elliptically polarizing plate, in which optical films have been combined, are utilized.

Furthermore, in reflection type, transflective type, and microreflection type LCDs, in which outside light is utilized as the light source, a circularly polarizing plate, in which a one-quarter wavelength plate has been combined with a linearly polarizing plate, is used.

Moreover, a normal one-quarter wavelength plate has a phase difference of one-quarter of a wavelength at only a single wavelength, and at other wavelengths the phase difference deviates from this value. Therefore with an object of making it function as a one-quarter wavelength plate over all of the visible region, wideband circularly polarizing plates wherein a wideband phase difference film, in which a single sheet or a plurality of sheets of one-half wavelength plates and one-quarter wavelength plates have been laminated, and a linearly polarizing plate, have been combined, and wideband elliptically polarizing plates wherein a phase difference film, in which a plurality of phase difference films have been laminated, is combined with the polarizing plate, are also being developed.

Normally, circularly polarizing plates, in which a polarizing plate and a one-quarter wavelength plate have been combined, are prepared by respectively laminating the polarizing plate and the one-quarter wavelength plate. At this time, they must be laminated such that the angle between the absorption axis of the polarizing plate and the slow axis of the one-quarter wavelength plate strictly meets 45°. Furthermore, in the same manner, in the wideband circularly polarizing plate, in which a polarizing plate and a wideband phase difference film, wherein a plurality of wavelength plates have been laminated, have been combined, there is a need to strictly control the lamination angle relating to the azimuth of each wavelength plate, and the lamination angle between the wavelength plate and the absorption axis of the polarizing plate.

Furthermore, in a case where it is used for a liquid crystal display element, the angle formed between the optical axis of the wavelength plate and the alignment direction of the liquid crystal must also be precisely made a designed value.

Conventionally, a birefringent aligned film is used for the phase difference film, although in recent years, as a phase difference film having more complex optical characteristics, optical films, where a polymerizable liquid crystal is applied on a substrate in which an alignment film has been provided, and cured in a state where the liquid crystal molecules are aligned, are being developed. Specifically, a film of a polymer, such as a polyimide, is provided on the substrate, the polymerizable liquid crystal is applied on an alignment film, in which the polyimide has been rubbed (rubbing method) in a single direction with a cloth, or the like, the liquid crystal molecules are aligned in the rubbing direction and the alignment is fixed by polymerization thereafter, and as a result of the combination between the alignment direction of the alignment film and the alignment form of the polymerizable liquid crystal, a phase difference film having optical characteristics that cannot be obtained in an aligned birefringent film, can be obtained.

However, in regard to the rubbing alignment film, there is a problem in that scratches and dust can occur at the time of the rubbing process. The generated dust can be removed by washing, or the like, but since scratches cannot be removed, there is concern that the optical uniformity of the laminated liquid crystal film will be greatly impaired. Furthermore, in a production process using a rubbing type alignment film and a roll form long length film, since there is a boundary in the rubbing direction with respect to the transportation direction of the film, it is in fact impossible to make the slow axis of the phase difference film the aforementioned lamination angle while it is a long length film. Therefore, in a normal production process, a method in which a rectangular shaped film is cut out of the long length film and laminated such that it becomes a suitable lamination angle, or a method in which films that has been cut out are laminated at a suitable angle, have been used. Accordingly, a very complex process had to be performed. Furthermore, since there was a need to incline the direction of cutting out with respect to the longitudinal direction of the long length film, there was a problem in that unusable portions, which were left behind after cutting, were generated. Furthermore, lamination accuracy could not be sufficiently obtained with respect to the desired lamination angle obtained from the aforementioned simulations, or the like, and there was a problem in that an optical film that has optical functions as designed could not be obtained.

Photoalignment films are known as an alignment film in which rubbing is not performed. The photoalignment method is one alignment method that is able to align the liquid crystal molecules without rubbing, and can generate a liquid crystal alignment capability in the film by simply irradiating light on a film that has been formed on the substrate and without making contact. The alignment can be controlled by the direction of the light, and in contrast to the rubbing method, since it has characteristics such as there being fundamentally no possibility of scratches and generated dust, there is a larger degree of freedom in the alignment state on preparing a phase difference film using a liquid crystal having a polymerizable group, there are no light leakages due to scratches, and a uniform film can be formed.

For example, a photoalignment film that is obtained by, applying a photoaligning polymerizable composition containing a dichromatic dye having two or more polymerizable groups in a single molecule on a substrate, and polymerization of the polymerizable groups by heating or irradiation of light following application of a photoalignment function by irradiating a polarized light (for example, refer to Patent Document 1), or a photoalignment film obtained by applying a polymerizable material, such as polyvinyl cinnamate, on a substrate, followed by a reaction performed by irradiating an anisotropic light (for example, refer to Patent Document 2), are known. Furthermore, an optical film comprising a photoalignment film comprising polyvinyl cinnamate as disclosed in Patent Document 2, and a polymerizable liquid crystal, is also known (for example, refer to Patent Documents 3 and 4). However, in regard to the optical films obtained using these photoalignment films, peeling, or the like, occurred at the interface between the photoalignment film and the polymerizable liquid crystal, and there was a problem in that the durability was inferior.

As an optical film with excellent durability, an optical compensation sheet with a superior durability, in which rubbing is performed on a polymer coating film, which has polymerizable groups, that is provided on a substrate, a discotheque liquid crystal that has polymerizable groups is applied thereon, and an optically anisotropic layer comprising the rubbing alignment film and the discotheque liquid crystal is chemically bonded via the interface, is known (for example, refer to Patent Document 5). However, since the method uses a rubbing alignment film, the problems that originate from the rubbing alignment film still cannot be solved. Furthermore, the optical compensation sheet relates to a perpendicular alignment film in which the in-plane direction of the discotheque liquid crystal molecules has been aligned in the perpendicular direction with respect to the substrate, and since the surface energy of the alignment film surface has been lowered by introducing long-chain alkyl chains or aliphatic chains, there was a tendency for the liquid crystal molecules to aggregate at the surface of the perpendicular alignment film, and there was a problem in that it was difficult to laminate in a thin-film state.

On the other hand, as a problem that is unique to laminated films, for example, there are cases where interface reflections occur at the boundary between the liquid crystal alignment film and the polymerizable liquid crystal layer, and there are cases where a problem occurs in that the desired transmitted light intensity is not obtained. This does not become so much of a problem in the case of an optical film comprising only an alignment film and a polymerizable liquid crystal layer (that is to say, there is one lamination interface), although in optical films where multiple layers have been laminated, such as wideband circularly polarizing plates in which a wideband phase difference film, comprising a single sheet or a plurality of sheets of one-half wavelength plates and one-quarter wavelength plates that have been laminated, and a linearly polarizing plate have been combined, or wideband elliptically polarizing plates wherein a phase difference film, in which a plurality of phase difference layers have been laminated, and a polarizing plate have been combined, since the number of lamination interfaces becomes numerous, it becomes a large cause for decreases in the transmitted light intensity. Consequently, the contrast demanded of the display decreases, and in particular, because the transmitted light intensity decreases in directions inclined from the screen normal, there were problems such as the deterioration of the viewing angle characteristics.

Patent Document 1: Japanese Unexamined Patent Application, First Publication No. 2002-250924
Patent Document 2: Japanese Unexamined Patent Application, First Publication No. Hei 07-138308
Patent Document 3: Japanese Unexamined Patent Application, First Publication No. Hei 06-289374
Patent Document 4: Japanese Unexamined Patent Application, First Publication No. Hei 08-15681
Patent Document 5: Japanese Unexamined Patent Application, First Publication No. Hei 09-152509.

DISCLOSURE OF INVENTION

Although an optical film having a variety of functions can be prepared by laminating two optically anisotropic layers, in order to design a precise optical film, the angle formed between the two optical slow axes must be made precisely the designed value. Furthermore, in the case of utilization in a liquid crystal display element, the angle formed between the optical axis of the optical film and the alignment direction of the liquid crystal must also be precisely the designed value.

However, as mentioned above, conventional optical films could not sufficiently obtain the aforementioned lamination accuracy, and optical films having optical functions as designed were not obtained. Moreover, in regard to optical films in which a polymer layer, which is obtained by applying and polymerizing a polymerizable liquid crystal on a liquid crystal alignment film, has been laminated, the adhesion between the liquid crystal alignment film layer and the polymer layer following curing was insufficient, and there was a problem of peeling occurring in the production process.

The problem to be solved by the present invention is in providing: an optical film formed by laminating a plurality of optically anisotropic layers (that is to say, wavelength plates) wherein;
1. complex processes, such as cutting out and laminating of the film, are not necessary,
2. it is precisely laminated with the positional relationship (lamination angle) of the optical axes as designed, and
3. it is difficult for peeling to occur between layers;
a circularly polarizing plate or an elliptically polarizing plate formed by laminating the optical film and a polarizing plate; a liquid crystal display element that utilizes these optical films; and a production method of the optical film.

The inventors have found that:
1. by utilizing a photoalignment film, a polymerizable liquid crystal layer that is aligned in an arbitrary alignment direction can be formed, and by repeating this process, a multilayered film having a desired slow axis lamination angle can be easily obtained;
2. since the alignment axis of the photoalignment film can be determined by the irradiation direction of the light, it can be laminated at a precise lamination angle as designed; and
3. by covalently bonding the interval between the photoalignment layer and the polymerizable liquid crystal layer, an optical film, in which it is difficult for peeling to occur and which has a strong interlayer adhesive strength, can be obtained.
From this they have arrived at the completion of the present invention. The photoalignment film layer and the polymer layer can also be obtained by the application method, the alignment direction can be controlled without making contact by the direction of the irradiation light, and a polymerizable liquid crystal layer that is aligned in an arbitrary alignment direction can be formed without the need for complex processes, such as the cutting out and the laminating of the film.

Specifically, by merely repeating a process (I) (hereunder abbreviated as "process (I)"), which has a (step a) for applying and drying a photoaligning polymerizable composition containing a compound having a photoaligning group and a polymerizable group, a (step b) for imparting a liquid crystal aligning capability by irradiating a polarized light of a wavelength that would be absorbed by the photoaligning group, or a non-polarized light from a diagonal direction with respect to the substrate, a (step c) for forming a polymerizable liquid crystal composition layer that has a polymerizable group at the top of the layer, and a (step d) for, in regard to the two layers that have been laminated, advancing the curing of both layers by means of radiation or heat at the same time as polymerizing the molecules of both layers, in this order, a plurality of times, an optical film with a multilayered structure that has a strictly controlled slow axis lamination angle can be easily obtained.

That is to say, the present invention provides an optical film in which a plurality of optically anisotropic layers, wherein a photoalignment layer (A), in which a liquid crystal aligning capability has been generated by means of photoirradiation, and a polymer layer (B), which contains a liquid crystal compound that has a polymerizable group, that is obtained by polymerization in a state where it has been aligned by the photoalignment layer (A), are bonded by covalent bonding, are laminated.

Furthermore, the present invention provides an elliptically polarizing plate having the above described optical film and a polarizing plate.

Moreover, the present invention provides a circularly polarizing plate having the above described optical film and a polarizing plate.

Furthermore, the present invention provides a liquid crystal display element that uses the above described optical film.

Moreover, the present invention is a production method of the above described optical film, and provides a method of producing the optical film that repeats a process (I) which has: a step a for forming a photoaligning polymerizable composition layer by applying and drying a photoaligning polymerizable composition containing a compound having a photoaligning group and a polymerizable group, or a compound having a photoaligning group and a polymerizable compound; a step b for imparting a liquid crystal aligning capability by irradiating a polarized light of a wavelength that would be absorbed by the photoaligning group, or a non-polarized light from a diagonal direction with respect to a substrate; a step c for forming a polymerizable liquid crystal composition layer containing a polymerizable liquid crystal composition that contains a liquid crystal compound having a polymerizable group at the top of the layer; and a step d for, in regard to the two layers that have been laminated, advancing the curing of both layers by means of radiation or heat at the same time as polymerizing the molecules of both layers, in this order, a plurality of times.

The optical film of the present invention is a laminated film that is precisely laminated with an optical axis positional relationship (lamination angle) as per the design, which is superior in durability. In regard to the circularly polarizing plate and the elliptically polarizing plate formed by laminating the optical film of the present invention and a polarizing plate, there is no need for strict positioning and complex processes, and it can be easily obtained. As for the optical film, the circularly polarizing plate, and the elliptically polarizing plate, these production processes thereof are different from conventional laminating methods in that wasted materials are not generated.

In the present invention, by further selecting a low molecular weight material as the compound within the optical film of the present invention that is a material of the photoalignment layer (A), in which a liquid crystal alignment capability has been generated by photoirradiation, that has a photoaligning group and a polymerizable group, or as a composition that contains a compound that has a photoaligning group but does not have a polymerizable group, and a generic polymer compound, the problem of "having a high transmitted light intensity", which is one of the problems of laminated optical films, can be solved. Since low molecular weight materials are somewhat inferior in smoothness, it is unlikely that a boundary occur between a layer and another layer that is laminated on top of the layer. That is to say, an optical film, in which interfacial reflections do not occur at the boundary between the photoalignment layer (A) and the polymer layer (B), that is optically particularly superior, can be obtained. This is particularly applicable in the case of wideband circularly polarizing plates, wideband elliptically polarizing plates, or the like, in which the optical film is obtained by laminating many layers.

The optical film, the circularly polarizing plate, and the elliptically polarizing plate of the present invention can all be obtained by the application method, and the present optical film can also be successively laminated on a linearly polarizing film. Consequently, there is no need for complex processes such as cutting out and laminating in which the angle is controlled as is conventionally necessary. Accordingly, the present invention is applicable to the roll-to-roll method, or the like, which uses a long length film and has a high productivity.

BRIEF DESCRIPTION OF THE REFERENCE SYMBOLS

10 Optical film, 11 Photoalignment layer (A), 12 Polymer layer (B), 13 Optically anisotropic layer, 14 Optically isotropic resin layer, 20 Polarizing plate

BEST MODE FOR CARRYING OUT THE INVENTION

Optically Anisotropic Layer

In regard to the optically anisotropic layer utilized in the present invention, the photoalignment layer (A) (hereunder abbreviated as layer (A)), in which a liquid crystal aligning capability has been generated by photoirradiation, and the polymer layer (B) (hereunder abbreviated as layer (B)) are bonded by covalent bonding. This is where a lamination film of a photoaligning polymerizable composition layer (hereunder abbreviated as a photoaligning polymerizable composition layer) containing; a photoaligning polymerizable composition that contains a compound having a photoaligning group and a polymerizable group (hereunder abbreviated as compound (C)), or a compound having a photoaligning group but not having a polymerizable group (hereunder abbreviated as compound (D)) and a generic polymerizable compound (hereunder abbreviated as compound (E)), and a polymerizable liquid crystal composition layer (hereunder abbreviated as a polymerizable liquid crystal composition layer) containing a polymerizable liquid crystal composition that contains a liquid crystal compound having a polymerizable group, is formed on the substrate, and it can be obtained by reacting both layers in a state where the liquid crystal compound having the polymerizable group is aligned. The photoaligning polymerizable composition layer corresponds to layer (A), and the polymerizable liquid crystal composition layer corresponds to layer (B). Furthermore, in regard to the optically anisotropic layer utilized in the present invention, there is no need for the layer (A) and the layer (B) to be completely polymerized and cured, and it is sufficient if the interface between the layer (A) and the layer (B) is bonded by covalent bonding.

Figure 1:
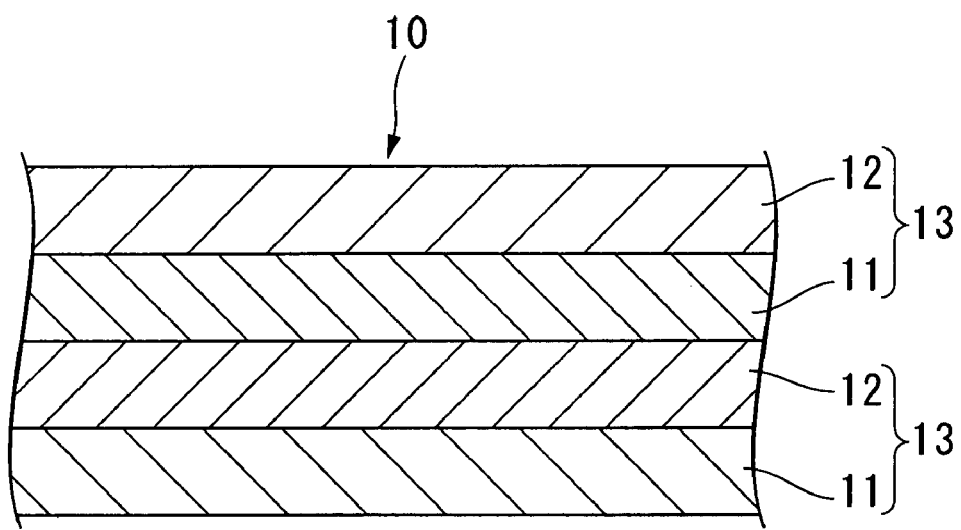
FIG. 1 is cross-sectional view of one example of an optical film of the present invention.

Specifically, the optically anisotropic layer can be obtained by using a process (I) (hereunder abbreviated as process (I)) having a step a for forming the photoaligning polymerizable composition layer by applying and drying a photoaligning polymerizable composition containing the compound (C), or the compound (D) and the compound (E), a step b for imparting a liquid crystal aligning capability by irradiating a polarized light of a wavelength that would be absorbed by the photoaligning group, or a non-polarized light from a diagonal direction with respect to a substrate, a step c for forming the polymerizable liquid crystal composition layer on this layer, and a step d for, in regard to the two layers that have been laminated, advancing the curing of both layers by means of radiation or heat at the same time as polymerizing the molecules of both layers, in this order. Furthermore, by repeating the process (I) a plurality of times, an optical film, in which a plurality of optically anisotropic layers have been laminated, can be obtained. One example of the optical film of the present invention is shown in FIG. 1. In FIG. 1, reference symbols 10, 11, 12, and 13 are the optical film, the photoalignment layer (A), the polymer layer (B), and the optically anisotropic layer, respectively.

(Layer (A) 11)

The layer (A) 11 contains a compound that has a group that generates a liquid crystal aligning capability by means of irradiating light (hereunder abbreviated as the photoaligning group), for example, a dichromatic dye.

In the present invention, the photoaligning group of the compound (C) or the compound (D) represents a group that generates a photoreaction, which becomes the origin of the liquid crystal aligning capability, such as alignment generation of the molecules as a result of the Weigert effect, which originates in photodichroism, or an isomerization reaction (example: an azobenzene group), a dimerization reaction (example: a cinnamoyl group), a photocrosslinking reaction (example: a benzophenone group), or a photolysis reaction (example: a polyimide group), which occur by irradiating light. Amongst these, one that utilizes alignment generation of the molecules as a result of the Weigert effect, which originates in dichroism, or an isomerization reaction, a dimerization reaction, or a photocrosslinking reaction is superior in alignment, and it is preferable in that the polymerizable liquid crystal compound can be easily aligned.

There are no particular restrictions on the photoaligning group, though amongst these, a group having at least one double bond selected from the group consisting of C=C, C=N, N=N, and C=O (however, double bonds that form aromatic rings are excluded), is used particularly preferably.

In the present invention, the Weigert effect refers to a change in the alignment direction of a molecule having a transition moment, in which the transition moment possessed by the molecule becomes perpendicular with respect to the polarization direction of the incident light.

As these photoaligning groups, examples of groups having a C=C bond include groups that have the structure of a polyene group, a stilbene group, stilbazol group, a stilbazolium group, a cinnamoyl group, a hemithioindigo group, or a chalcone group. Examples of groups that have a C=N bond include groups that have the structure of an aromatic Schiff salt, or an aromatic hydrazone. Examples of groups that have an N=N bond include groups that have the structure of an azobenzene group, an azonaphthalene group, an aromatic heterocyclic azo group, a bisazo group, or a formazan group, and those in which azoxybenzene as the basic structure. Examples of groups that have a C=O bond include groups that have the structure of a benzophenone group, a coumarin group, or an anthraquinone group. These groups may have substituents such as an alkyl group, an alkoxy group, an aryl group, an allyloxy group, a cyano group, an alkoxycarbonyl group, a hydroxyl group, a sulfonic acid group, or a halogenated alkyl group.

Amongst these, the amount of irradiation of polarized light necessary for photoalignment is small for the azobenzene group and the anthraquinone group, which exhibit photoalignment by a photoisomerization reaction, and the benzophenone group, the cinnamoyl group, the chalcone group, and the coumarin group, which exhibit photoalignment by a photodimerization reaction, and since the thermal stability and the temporal stability of the obtained photoalignment film is superior, they are particularly preferable. Within these, the azobenzene group is preferable.

In the optically anisotropic layer 13 utilized in the present invention, the layer (A) and the layer (B) are bonded by covalent bonding. Here, a lamination film of a photoaligning polymerizable composition layer and a polymerizable liquid crystal composition layer is formed on the substrate, and it can be obtained by reacting both layers in a state where the liquid crystal compound, which has the polymerizable group, is aligned.

(Compound (C) and (D))

Examples of polymerizable groups of the compound (C) include a (meta)acryloyl group, a (meta)acryloyloxy group, a (meta)acrylamide group, a vinyl group, a vinyloxy group, an azido group, a chloromethyl group, an epoxy group, and an maleimide group. Amongst these, since photopolymerization and heat polymerization is comparatively easy, the (meta)acryloyl group, the (meta)acryloyloxy group, the (meta)acrylamide group, the vinyl group, and the vinyloxy group are preferable, and the (meta)acryloyl group, the (meta)acryloyloxy group, and the (meta)acrylamide group are particularly preferable. Furthermore, if it is a maleimide group, it can be polymerized without utilizing a photoinitiator.

These polymerizable groups may be directly bonded to the photoaligning group, or they may be bonded through a linking group, such as an alkylene group and a phenylene group. The linking group may have an ester bonding, an ether bonding, an imide bonding, an amide bonding, or a urethane bonding. Examples of such linking groups include: straight-chain form alkylene groups with 1 to 18 carbon atoms, such as a methylene group, an ethylene group, a trimethylene group, a tetramethylene group, a pentamethylene group, a hexamethylene group, a heptamethylene group, an octamethylene group, a nonamethylene group, a decamethylene group, an undecamethylene group, and a dodecamethylene group; a branched form alkylene group with 1 to 18 carbon atoms, such as a 1-methylethylene group, a 1-methyl-trimethylene group, a 2-methyl-trimethylene group, 1-methyl-tetramethylene group, a 2-methyl-tetramethylene group, a 1-methyl-pentamethylene group, a 2-methyl-pentamethylene group, and a 3-methyl-pentamethylene group; a phenylene group such as a p-phenylene group; and an alkoxyphenylene group that has a straight-chain form or branched form alkoxyl group with 1 to 18 carbon atoms, such as a 2-methoxy-1/4-phenylene group, a 3-methoxy-1/4-phenylene group, a 2-ethoxy-1/4-phenylene group, a 3-ethoxy-1/4-phenylene group, and a 2,3,5-trimethoxy-1/4-phenylene group.

There are no particular restrictions on the molecular weight of the compound (C) and the compound (D), although normally $1\times10^2$ to $1\times10^6$ by mass average molecular weight conversion is utilized. However, if the molecular weight becomes too high, it becomes difficult for the photoaligning group to move within the system, and there is a trend in that the sensitivity with respect to the light decreases. Furthermore, in general, the more the molecular weight of a polymer increases, the better the film-forming property becomes, and a film with a smooth surface is obtained. However, in the present invention, if the layer (A) 11 surface is too superior in smoothness, a boundary is generated with the layer (B) 12, and there are some cases where optical effects are generated. Accordingly, as the molecular weight, the range of $1\times10^2$ to $1\times10^5$ is more preferable, and the range of $1\times10^2$ to $5\times10^3$ is even more preferable.

As the compound (C), specifically, compounds represented by the general formula (1) are preferable.

$$R^1—X^1—Y—X^2—R^2 \quad (1)$$

In the formula, $R^1$ and $R^2$ respectively and independently represent a polymerizable group selected from within a group comprising the (meta)acryloyl group, the (meta)acryloyloxy group, the (meta)acrylamide group, the vinyl group, the vinyloxy group, and the maleimide group. Amongst these, if it is the (meta)acryloyl group, the (meta)acryloyloxy group, or the (meta)acrylamide group, it is preferable since photopolymerization and heat polymerization is comparatively easy. Furthermore, in regard to the maleimide group, an initiator becomes unnecessary, and it is more preferable.

In the general formula (1), $X^1$ represents a linkage group represented by -$(A^1-B^1)_m$—, and $X^2$ represents a linkage group represented by —$(B^2-A^2)_n$-. Here, $A^1$ and $A^2$ respectively and independently represent a single bond or a bivalent hydrocarbon group. Examples of bivalent hydrocarbon groups include: alkylene groups with 1 to 20 carbon atoms such as an ethylene group, a methylene group, a propylene group, a pentamethylene group, and a heptylene group; cycloalkylene groups with 3 to 20 carbon atoms such as a cyclopropylene group and a cyclohexylene group; and arylene groups with 6 to 20 carbon atoms such as a phenylene group and a naphthylene group. Amongst these, alkylene groups are preferable, and alkylene groups with 1 to 4 carbon atoms are more preferable.

$B^1$ and $B^2$ respectively and independently represent a single bond, —O—, —CO—O—, —OCO—, —CONH—, —NHCO—, —NHCO—O—, or —OCONH—. m and n respectively and independently represent an integer from 1 to 4. When m or n is 2 or more, $A^1$, $B^1$, $A^2$, and $B^2$, of which there are a plurality, may be the same, or may be different. However, $A^1$ or $A^2$ may not be a single bond when it is between two of $B^1$ or $B^2$. Specifically, when m is 2, the linkage group represented by -$(A^1-B^1)_m$— represents —$CH_2CH_2$—O—$CH_2CH_2CH_2CH_2$—CO—O—, —O—$CH_2CH_2CH_2$—CO—O—, or the like, and when n is 2, the linkage group represented by —$(B^2-A^2)_n$- represents —O—CO-Ph (a phenylene group) —O—$(CH_2)_6$—, or the like.

Y represents a group that has an azobenzene group, an anthraquinone group, a benzophenone group, a cinnamoyl group, a chalcone group, or a coumarin group. Amongst these, the groups of the following structures are preferable.

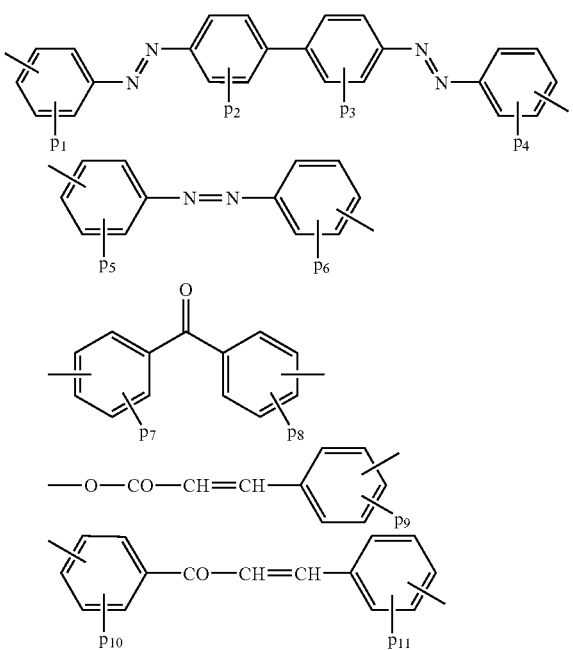

In the structures, $P_1$ to $P_{11}$ respectively and independently represent a hydrogen atom, a halogen atom, a halogenated alkyl group, a halogenated alkoxy group, a cyano group, a nitro group, an alkyl group, a hydroxyalkyl group, an alkoxy group, an aryl group, an allyloxy group, an alkoxycarbonyl group, a carboxyl group, a sulfonic acid group, an amino group, or a hydroxyl group. However, the carboxyl group and the sulfonic acid group may form a salt with an alkali metal.

Examples of the compound represented by the general formula (1) specifically include the compounds disclosed in Japanese Unexamined Patent Application, First Publication No. 2002-250924 and Japanese Unexamined Patent Application, First Publication No. 2002-317013, and it can be easily synthesized by the methods disclosed in these publications.

Since the compound represented by the general formula (1) is a low molecular weight compound, it has an excellent light sensitivity at the time of coating. Accordingly, a liquid crystal aligning capability can be more easily imparted by means of photoirradiation. Furthermore, in regard to the polymerizable group, it has a high reaction rate since it has a higher degree of freedom than a polymerizable group bonded to a polymer, the layer (A) 11 and the layer (B) 12 can be adequately reacted at the interface, and the adhesion at the interface becomes excellent.

Examples of the compound (D) include an azo dye, an anthraquinone dye, an indigo dye, a phthalocyanine dye, a carbonium dye, a quinoneimine dye, a methine dye, a quinoline dye, a nitro dye, a nitroso dye, a benzoquinone dye, a naphthoquinone dye, a naphthalimide dye, and a perinone dye, although specifically, compounds represented by the general formula (2) are preferable.

In the formula, $X^1$, Y, and $X^2$ represent the same groups as the groups in the general formula (1).

$R^3$ and $R^4$ respectively and independently represent a hydrogen atom, a halogen atom, a hydroxyl group, a nitro group, a sulfonic acid group, a sulfonate group, a halogenated methyl group, a cyano group, an amino group, a formyl group, a carboxyl group, a piperidino group, and one or more of the groups selected from a group comprising a general formula (3).

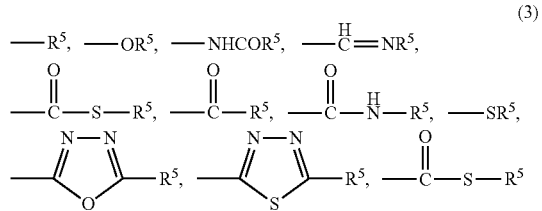

(wherein, $R^5$ represents a hydrogen atom, an alkyl group, a cycloalkyl group, a phenyl group, and a piperidino group; and organic groups in which an alkyl group, a cycloalkyl group, a phenyl group, an alkoxyl group, a cycloalkoxyl group, or a phenoxy group is bonded to these groups)

(Compound (E))

Examples of the compound (E) include polymerizable compounds such as a (meta)acryloyl group, a (meta)acryloyloxy group, a (meta)acrylamide group, a vinyl group, a vinyloxy group, an azido group, a chloromethyl group, an epoxy group, and a maleimide group. Amongst these, acrylic monomers and silane coupling agents, such as methacrylic acid-3-trimethoxysilylpropylether, which have a strong hydrophilic tendency, are preferable. The compound (E) can be utilized by addition to the compound (C) in a range in which photoalignment is not lost. As a specific addition amount, 10 to 95 weight % is preferable, 20 to 90 weight % is more preferable, and 20 to 50 weight % is even more preferable.

There are no particular restrictions on the molecular weight of the compound (E), although normally, it is preferable to utilize a compound of approximately 50 to 1000 by mass average molecular weight conversion. If the molecular weight becomes too high, it becomes difficult for the compound (D) to move within the system, and there is a trend in that the sensitivity with respect to the light decreases. Furthermore, in general, the more the molecular weight of a polymer increases, the better the film-forming property becomes, and a film with a smooth surface is obtained. However, in the present invention, if the layer (A) 11 surface is too superior in smoothness, a boundary is generated with the layer (B) 12, and there are some cases where optical effects are generated.

In regard to the "optical effects" referred to here, the transmitted light intensity ratio becomes one of the indices. For example, the contrast is represented by the transmitted light intensity ratio at the time of bright state with respect to a low transmitted light intensity that is almost near 0.0 at the time of dark state. That is to say, if the transmitted light intensity ratio in a direction that is inclined with respect to the front face decreases by 1.0%, the observed contrast decreases even more, and it becomes a cause for the viewing angle characteristics of the contrast to greatly decrease.

It is preferable for the compounds (C), (D), and (E) to be utilized by dissolution in an appropriate solvent. There are no particular restrictions on the solvent, although examples include: glycol species such as ethylene glycol, propylene glycol, and dipropylene glycol monomethyl ether; alcohol species such as methanol, ethanol, isopropyl alcohol, and butanol; and water, N-methylpyrrolidone (hereunder abbreviated as NMP), butyl cellosolve, phenyl cellosolve, N,N-dimethylformamide (hereunder abbreviated as DMF), γ-butyrolactone, dimethylsulfoxide (hereunder abbreviated as DMSO), toluene, tetrahydrofuran, chlorobenzene, and dimethylacetamide. It is preferable for these solutions to be selected with consideration of the coating properties, the volatilization rate of the solvent following application, and the resistance of the substrate to solvent dissolution, and a mixture of two or more types can be utilized. Amongst these, a mixed solvent of butyl cellosolve and water, and mixed solvents comprising alcohol species or glycol species have an excellent coating properties with respect to a substrate of a polymer film, or the like, and they are particularly preferable because a uniform film can be obtained without attacking the polymer film.

Since the solvent is volatilized and removed following application to the substrate, in a case where it is utilized, it is necessary for the solid content concentration of the compound (C) to be at least 0.2 weight % or more. Among the range, a range of 0.3 to 10 weight % is particularly preferable. Furthermore, polymer materials, such as polyvinyl alcohols and polyimides, can also be mixed in a range in which the effects of the present invention are not lost.

If the film thickness of the layer (A) 11 is thin, the ultraviolet radiation energy used in alignment processing can be suppressed lower, and this is preferable since the production rate can be increased. However, if it is too thin, the layer (A) 11 is likely to be affected by the surface smoothness or surface characteristics of the substrate, and the uniformity of alignment deteriorates. Accordingly, an optimal range exists. In regard to the film thickness of the layer (A) 11, 1 to 200 nm is preferable, 5 to 100 nm is more preferable, and 10 to 40 nm is even more preferable.

(Layer (B) 12)

In the present invention, there are no particular restrictions on the liquid crystal compound that has a polymerizable group, which is included in the polymerizable liquid crystal composition that constitute the layer (B) 12, as long as it is a compound that exhibits a liquid crystallinity as a single component or in a composition with another liquid crystal compound, and it has a polymerizable group. Examples include rod-shaped liquid crystal compounds that have, a rigid part called a mesogenic group, in which a plurality of structures, such as a 1,4-phenylene group, and a 1,4-cyclohexylene group, are connected, and a polymerizable group such as a (meta)acryloyl group, a vinyloxy group, and an epoxy group, such as those disclosed in Handbook of Liquid Crystals (D. Demus, J. W. Goodby, G. W. Gray, H. W. Spiess, edited by V. Vill, published by Wiley-VCH Co., 1998), Quarterly Chemistry Reviews No. 22, Chemistry of Liquid Crystals (edited by the Chemical Society of Japan, 1994), or Japanese Unexamined Patent Application, First Publication No. Hei 7-294735, Japanese Unexamined Patent Application, First Publication No. Hei 8-3111, Japanese Unexamined Patent Application, First Publication No. Hei 8-29618, Japanese Unexamined Patent Application, First Publication No. Hei 11-80090, Japanese Unexamined Patent Application, First Publication No. Hei 11-148079, Japanese Unexamined Patent Application, First Publication No. 2000-178233, Japanese Unexamined Patent Application, First Publication No. 2002-308831, and Japanese Unexamined Patent Application, First Publication No. 2002-145830.

Furthermore, examples include discotheque liquid crystal compounds that have a polymerizable group such as those disclosed in Handbook of Liquid Crystals (D. Demus, J. W. Goodby, G. W. Gray, H. W. Spiess, edited by V. Vill, published by Wiley-VCH Co., 1998), Quarterly Chemistry Reviews No. 22, Chemistry of Liquid Crystals (edited by the Chemical Society of Japan, 1994), and Japanese Unexamined Patent Application, First Publication No. Hei 07-146409. Amongst these, rod-shaped liquid crystal compounds that have a polymerizable group are preferable because it is easy to prepare the polymerizable liquid crystal composition in which the liquid crystalline phase temperature range includes a low temperature of approximately room temperature.

(Process (I))

An example is given as a specific aspect of the process (I).

1. Method of Addition of a Photoinitiator to the Polymerizable Liquid Crystal Composition Layer A photoaligning polymerizable composition not containing a polymerization initiator is applied and dried on the substrate, and thereafter, a liquid crystal aligning capability is imparted to the film by irradiating polarized light of a wavelength that would be absorbed by the photoaligning group possessed by the compound (C) or (D). In a case where the photoaligning group is a group that uses alignment generation of the molecules as a result of the Weigert effect, an isomerization reaction, or the like, the liquid crystal aligning function may be applied by irradiating non-polarized light of a wavelength that is well-absorbed by the group from a diagonal direction with respect to the substrate (this is the same in the other aspect). Next, a polymerizable liquid crystal composition solution containing the photoinitiator is applied thereon, and once it is dried, the polymerizable liquid crystal composition layer takes an aligned state as a result of the effect of the liquid crystal aligning capability of the photoaligning polymerizable composition layer. Then, light of a wavelength that is absorbed by the added photoinitiator is irradiated on the two layers that have been laminated, and at the same time as progressing the curing of the polymerizable liquid crystal compound, the molecules of both layers are polymerized by means of the photoinitiator that is present at the interface between the polymerizable liquid crystal composition layer and the photoaligning polymerizable composition layer. The radicals that are generated by cleavage of the photoinitiators are able to move within both layers. Therefore, if the photoinitiator is contained in either of the layers, the polymerizable groups that are present at the interface of both layers can be polymerized, the layer (A) 11 and the layer (B) 12 are covalently bonded, and an optically anisotropic layer 13 with improved adhesiveness can be obtained. Furthermore, in this method, the photoaligning polymerizable composition does not contain the photoinitiator. Therefore, there is no concern for unexpected polymerization occurring during irradiation of the polarized light, or the like, and the alignment process can be uniformly performed.

Alternatively, following application and drying of a photoaligning polymerizable composition that does not contain a polymerization initiator on a transparent substrate, a polymerizable liquid crystal composition layer that contains a photoinitiator is formed thereon without alignment. Next, from the transparent substrate side (the face on the opposite side to the coated face), irradiation of a polarized light of a wavelength that would be absorbed by a photoaligning group possessed by the compound (C) or (D), or of a non-polarized light from a diagonal direction with respect to the substrate, is performed. In this method, the photoaligning group within the photoaligning polymerizable composition firstly absorbs a large portion of the irradiated light, the liquid crystal aligning capability thereof is generated, and the molecules of the laminated polymerizable liquid crystal composition layer are aligned. Together with the progress of the irradiation, by means of a mechanism explained below, the irradiated light becomes transmitted through the photoaligning polymerizable composition layer and reaches the polymerizable liquid crystal composition layer, and together with cleaving the photoinitiator within the layer and generating a polymerization reaction, bonding between the photoaligning polymerizable composition layer and the polymerizable liquid crystal composition layer occurs.

That is to say, if photoirradiation is performed from the transparent substrate side, in a system, such as an azobenzene group, in which an isomerization reaction occurs and molecule alignment is generated by means of the Weigert effect, the alignment direction of the photoaligning polymerizable composition changes as a result of light absorption, and it takes an alignment state such that the absorption is minimized. Consequently, the irradiated light becomes gradually leaked to the polymerizable liquid crystal composition layer, and polymerization of the polymerizable liquid crystal composition layer is induced. In the same manner, in regard to the photoaligning polymerizable composition layer, even in a case where a compound that uses a dimerization reaction (example: a cinnamoyl group), a photocrosslinking reaction (example: a benzophenone group), or a photolysis reaction (example: a polyimide group) is used, components that are aligned in the direction by means of the absorption of polarized light respectively undergo dimerization, photocrosslinking, or photolysis, the groups that absorb the light gradually decrease and the irradiated light becomes leaked to the polymerizable liquid crystal composition layer, and the polymerization of the polymerizable liquid crystal composition layer is induced. Accordingly, the layer (A) 11 and the layer (B) 12 are covalently bonded, and an optically anisotropic layer 13 with improved adhesiveness can be obtained. In this case, the photoaligning polymerizable composition does not contain a photoinitiator. Therefore there is no concern for unexpected polymerization occurring during irradiation of the polarized light, and the alignment process can be uniformly performed.

2. Method for Addition of a Photoinitiator Possessing a Photoabsorption Band that Differs from the Absorption Band of Compound (C) or (D) to Either the Polymerizable Liquid Crystal Composition or the Photoaligning Polymerizable Composition, or Both Following application and drying of the photoaligning polymerizable composition solution on the substrate, a liquid crystal aligning capability is imparted by irradiation of, a polarized light of a wavelength that would be absorbed by the photoaligning group possessed by the compound (C) or (D), or a non-polarized light from a diagonal direction with respect to the substrate. Following application and drying of the polymerizable liquid crystal composition solution thereon, the polymerizable liquid crystal compound is made the intended alignment state. Next, as well as irradiating light of a wavelength that is absorbed by the photoinitiator added to the two layers that have been laminated, and bonding the molecules of the interface between the polymerizable liquid crystal composition layer and the photoaligning polymerizable composition layer, the respective curing of the polymerizable liquid crystal compound and the compound (C) or the compound (E) is progressed. The layer (A) 11 and the layer (B) are also covalently bonded by such an operation, and an optically anisotropic layer 13, in which the adhesiveness between both layers has been improved, can be obtained.

3. Method for Addition of a Hardener (a Catalyst in Hardening Thermosetting Materials, i.e. Thermoinitiator) to Either the Polymerizable Liquid Crystal Composition or the Photoaligning Polymerizable Composition, or Both Following application and drying of the photoaligning polymerizable composition solution on the substrate, a liquid crystal aligning capability is imparted by irradiation of, a polarized light of a wavelength that would be absorbed by the photoaligning group possessed by the compound (C) or (D), or a non-polarized light from a diagonal direction with respect to the substrate. Next, a polymerizable liquid crystal composition layer is formed on the layer, and at the same time as progressing the curing of both layers by heating both layers and cleavage of the hardener, the molecules of both layers are polymerized by means of the hardener that is present at the interface between the polymerizable liquid crystal composition layer and the photoaligning polymerizable composition layer. The radicals that are generated by cleavage of the hardener are able to move within both layers. Therefore if the photoinitiator is contained in either of the layers, the polymerizable groups that are present at the interface of both layers can be polymerized, the layer (A) 11 and the layer (B) 12 are covalently bonded, and an optically anisotropic layer 13 with improved adhesiveness can be obtained.

4. Method for Using a Hardener and a Photoinitiator in Combination

Following application and drying of the photoaligning polymerizable composition, which contains a hardener, on the substrate, a liquid crystal aligning capability is imparted by irradiation of, a polarized light of a wavelength that would be absorbed by the photoaligning group possessed by the compound (C) or (D), or a non-polarized light from a diagonal direction with respect to the substrate. Next, a polymerizable liquid crystal composition layer, which contains a photoinitiator, is formed on the layer, and in regard to the two layers that have been laminated, by irradiating light of a wavelength that is absorbed by the photoinitiator while heating the hardener to a suitable temperature at which it undergoes cleavage, the molecules of both layers are polymerized as well as progressing the curing of both layers.

Alternatively, a photoinitiator is added to the photoaligning polymerizable composition, in which the photoabsorption wavelength band is different to the absorption band of the photoaligning polymerizable composition itself, and following film production and drying, a liquid crystal aligning capability is imparted by irradiation of a polarized light that would be absorbed by the photoaligning group possessed by the compound (C) or (D), or a non-polarized light from a diagonal direction with respect to the substrate. Next, a polymerizable liquid crystal composition layer, to which a hardener has been added, is formed on the layer, and the molecules of both layers are polymerized at the same time as progressing the curing of both phases by heating both layers while irradiating light that is absorbed by the photoinitiator. As a result of such an operation, bonding is provided between the photoaligning polymerizable composition layer and the polymerizable liquid crystal composition layer, and a phase difference layer, in which the adhesiveness has been improved, can be obtained.

(Application Method)

In regard to the method for forming the respective composition layers on the substrate, commonly known methods can be utilized, including application methods such as the spin coating method, the extrusion method, the gravure coating method, the die coating method, the bar coating method, and the applicator method, and printing methods such as the flexographic method.

(Substrate)

There are no particular restrictions on the material of the substrate as long as it is essentially transparent, and glass, ceramics, plastics, or the like, may be utilized. As a plastic substrate, cellulose, cellulose derivatives such as triacetylcellulose and diacetylcellulose, polycycloolefin derivatives, polyesters such as polyethylene terephthalate and polyethylene naphthalate, polyolefins such as polypropylene and polyethylene, polycarbonate, polyvinyl alcohol, polyvinyl chloride, polyvinylidene chloride, nylon, polystyrene, polyacrylate, polymethyl methacrylate, polyether sulfone, and polyalylate, may be used.

Figure 2:
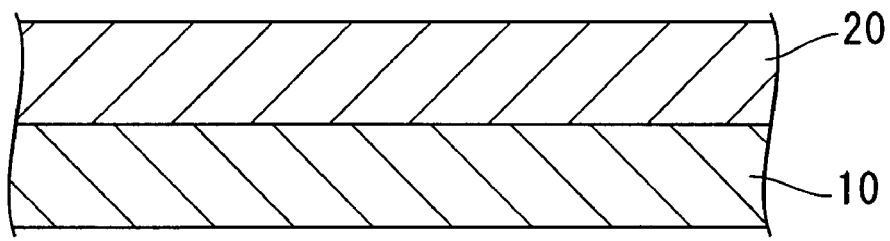
FIG. 2 is a cross-sectional view of one example of an elliptically polarizing plate and a circularly polarizing plate using the optical film of the present invention.

The optical film 10 of the present invention produced by application on the substrate may be laminated to a linearly polarizing film, or the optical film 10 formed by means of application may be peeled from the substrate and laminated onto the linearly polarizing film, or the optical film 10 of the present invention may be directly formed on the polarizing film or the polarizing plate, and it can also be made a circularly polarizing plate and an elliptically polarizing plate. An example of a circularly polarizing plate or a elliptically polarizing plate is shown in FIG. 2. In FIG. 2, reference symbol 20 represents a polarizing plate.

(Photoalignment Operation)

In order to impart a liquid crystal aligning capability to the photoaligning polymerizable composition layer (hereunder abbreviated as a photoalignment operation), it is sufficient for polarized light of a wavelength that would be absorbed by a photoaligning group possessed by the compound (C) or (D) to be irradiated from the coating surface, or the substrate side on the opposite side to the coating surface, perpendicularly or from a diagonal direction with respect to the face. Furthermore, in a case where the photoaligning group is a group that uses alignment generation of molecules by means of the Weigert effect, an isomerization reaction, or the like, a liquid crystal aligning function can be applied by irradiating non-polarized light of a wavelength that is efficiently absorbed by the group from the coating surface or the substrate side, from a diagonal direction with respect to the face. Furthermore, the polarized light and the non-polarized light may be combined.

The polarized light may be either linearly polarized or elliptically polarized, although in order to efficiently perform photoalignment, it is preferable to use linearly polarized light, which has a high extinction ratio.

Furthermore, since there is a need to use a polarizing filter in order to obtain the polarized light, there is a shortcoming in that the light intensity irradiated on the film face decreases. However in a method in which non-polarized light is irradiated from a diagonal direction with respect to the film face, a polarizing filter is not required for the irradiation device, a large irradiation intensity can be obtained, and there is an advantage in that the irradiation time for photoalignment can be shortened. At this time, in regard to the angle of incidence of the non-polarized light, a range of 10° to 80° with respect to the substrate normal is preferable, and when the uniformity of the irradiation energy at the irradiation face, the obtained pretilt angle, the alignment efficiency, or the like, are considered, a range of 20° to 60° is most preferable.

In regard to the irradiated light, it is adequate if it is light of the wavelength region in which the photoaligning group of the compound (C) or (D) has its absorption band. For example, in a case where the photoaligning group has an azobenzene structure, ultraviolet radiation in a wavelength range of 350 to 500 nm, in which a strong absorption band resulting from a π→π* transition of azobenzene, is particularly preferable. Examples of light sources of the irradiated light include a xenon lamp, a high pressure mercury lamp, an extra-high pressure mercury lamp, a metal halide lamp, and ultraviolet lasers such as KrF and ArF. Particularly, in a case where the photoaligning group has an azobenzene structure, the ultraviolet radiation emission intensity at 365 nm of the extra-high pressure mercury lamp is high, and it is particularly preferable. By passing the light from the light source through a polarizing filter or a polarizing prism such as a Glan-Thompsom prism or a Glan-Taylor prism, linearly polarized ultraviolet radiation can be obtained. Furthermore, in a case where either polarized light or non-polarized light is utilized, it is particularly preferable for the irradiated light to be approximately parallel light. The irradiated light may be irradiated from the coating surface side or the substrate side. In a case where irradiation is performed from the substrate side, a substrate that has transparency is used as the substrate.

(Polymerization)

The polymerization operation of the photoaligning polymerizable composition and the polymerizable liquid crystal composition of the present invention are generally performed by photoirradiation by ultraviolet radiation, or the like, or by heating.

In a case where polymerization is performed by photoirradiation, in order to avoid disturbing the alignment state of the photoaligning polymerizable composition layer that has already been obtained, generally, it is preferable to perform polymerization at a wavelength other than the light absorption band possessed by the compound (C) or (D), for example, the absorption band possessed by the azobenzene structure or the anthraquinone structure. Specifically, it is preferable for ultraviolet radiation below 320 nm to be irradiated, and it is most preferable for light of a wavelength of 250 to 300 nm to be irradiated. In regard to this light, in order to not disturb the alignment of the photoaligning group that has already been obtained, it is preferable if it is light that is diffused light, and is not polarized. For this reason, it is preferable to use a photoinitiator possessing a photoabsorption wavelength band that is different to the light absorption band that is possessed by the compound (C) or (D). On the other hand, in a case where the light for polymerization is irradiated from the same direction as the photoalignment operation, there is no concern for the alignment state of the photoaligning material being disturbed, and an arbitrary wavelength can be used.

As the photoinitiator, commonly known and used materials can be utilized, and examples include 2-hydroxy-2-methyl-1-phenylpropan-1-one ("Darocur 1173" manufactured by Merck Co.), 1-hydroxycyclohexylphenylketone ("Irgacure 184" manufactured by Ciba Specialty Chemicals K.K.), 1-(4-isopropylphenyl)-2-hydroxy-2-methylpropan-1-one ("Darocur 1116 manufactured by Merck Co.), 2-methyl-1-[(methylthio)phenyl]-2-morpholinopropane-1-one ("Irgacure 907" manufactured by Ciba Specialty Chemicals K.K.), benzylmethylketal ("Irgacure 651" manufactured by Ciba Specialty Chemicals K.K.), a mixture of 2,4-diethylthioxanthone ("Kaya Cure DETX" manufactured by Nippon Kayaku Co. Ltd.) and p-dimethylaminoethylbenzoate ("Kaya Cure EPA" manufactured by Nippon Kayaku Co. Ltd.), a mixture of isopropylthioxanthone ("Quantacure-ITX" manufactured by Ward Blenkinsop Corp.) and p-dimethylaminoethylbenzoate, and acylphosphineoxide ("Lucirin TPO" manufactured by BASF Corp.). In regard to the usage quantity of the photoinitiator with respect to the composition, 10 weight % or less is preferable, and 0.5 to 5 weight % is particularly preferable.

The light for polymerization may be irradiated from the polymerizable liquid crystal composition layer surface, or irradiated from the substrate side, and although it is acceptable for it to be arbitrary, it is normally irradiated from the side in which the photoinitiator has been added.

On the other hand, in the case of polymerization by means of heating, it is preferable to performing polymerization at a temperature at which the polymerizable liquid crystal composition exhibits a liquid crystal phase, or lower. In particular, in a case where a hardener that releases radicals as a result of heating is utilized, it is preferable for the cleavage temperature thereof to be within the liquid crystal phase temperature range of the polymerizable liquid crystal composition, or lower. Furthermore, in a case where both a hardener and a photoinitiator are used, as well as the aforementioned restrictions on the temperature range, it is preferable for the polymerization temperature and the respective initiators to be selected such that the polymerization rate of both the photoaligning polymerizable composition layer and the polymerizable liquid crystal composition layer do not greatly differ. Although the heating temperature depends on the transition temperature of the liquid crystal phase of the polymerizable liquid crystal composition to the isotropic phase, it is preferable to perform polymerization at a temperature that is lower than the temperature at which heterogeneous polymerization is generated as a result of heat, and 20° C. to 300° C. is preferable, 30° C. to 200° C. is more preferable, and 30° C. to 120° C. is particularly preferable. Furthermore, for example, in a case where the polymerizable group is a (meth)acryloyl group, it is preferably performed at a temperature lower than 90° C., and 30° C. to 90° C. is more preferable.

In the aforementioned case, it is preferable to use an appropriate hardener. As the hardener, commonly known and used materials can be utilized, and examples include: organic peroxides, such as methylacetoacetateperoxide, cumenehydroperoxide, benzoylperoxide, bis(4-t-butylcyclohexyl)peroxydicarbonate, t-butylperoxybenzoate, methylethylketoneperoxide, 1,1-bis(t-hexylperoxy) 3,3,5-trimethylcyclohexane, p-pentadihydroperoxide, t-butylhydroperoxide, dicumylperoxide, isobutylperoxide, di(3-methyl-3-methoxybutyl)peroxydicarbonate, and 1,1-bis(t-butylperoxy)cyclohexane; azonitrile compounds, such as 2,2'-azobisisobutyronitrile and 2,2'-azobis(2,4-dimethylvaleronitrile); azoamidine compounds, such as 2,2'-azobis(2-methyl-N-phenylpropione-amidine)dihydrochloride; azoamide compounds, such as 2,2'-azobis{2-methyl-N-[1,1-bis(hydroxymethyl)-2-hydroxyethyl]propionamide}; and alkylazo compounds such as 2,2'-azobis(2,4,4-trimethylpentane). In regard to the usage quantity of the hardener with respect to the composition, 10 weight % or less is preferable, and 0.5 to 5 weight % is particularly preferable.

In regard to the polymerization initiator described above, such as the photoinitiator and the hardener, it is sufficient if it is included in either the photoaligning polymerizable composition layer or the polymerizable liquid crystal composition layer having a polymerizable group, or it may be included in both. Since the interface of both layers is a liquid state, the polymerization initiator and the radicals that are generated by cleavage of the polymerization initiator are able to move between the layers to some extent. Accordingly, if it is included in either of the layers, both layers can be polymerized at the same time, and an optically anisotropic layer 13, in which the layer (A) 11 and the layer (B) 12 are covalently bonded and laminated, can be obtained.

For example, in a case where the photoaligning polymerizable composition does not contain a polymerization initiator, and the polymerization initiator is included in the polymerizable liquid crystal composition, the polymerization initiator somewhat moves from the polymerizable liquid crystal composition layer to the photoaligning polymerizable composition layer. By further applying light or heat, the radicals generated within the polymerizable liquid crystal composition move to the photoaligning polymerizable composition layer, and both layers and the interface thereof can be polymerized.

Although the thinner the film thickness of the obtained optical film 10 the more preferable, when the ease of film thickness control and the size of the birefringence of the polymerizable liquid crystal cured film is considered, the preferable film thickness of a single layer of the optically anisotropic layer 13, which comprises the photoalignment film and the polymerizable liquid crystal layer, is preferably 0.1 to 20 µm, more preferably 0.5 to 10 µm, and most preferably 1 to 5 µm.

In the present invention, the number of laminations, the azimuth with respect to the incident light, and the phase difference value of the optically anisotropic layers 13 that are obtained by repeating the process (I) a plurality of times, in which a plurality of layers are laminated, can be arbitrarily selected and combined according to the required characteristics of the desired circularly polarizing plate or the elliptically polarizing plate.

(Number of Laminations)

In regard to the number of laminations, since the larger the number of laminations, a wideband polarizing plate can be obtained, there are no particular definite thresholds. However, since if too many layers are laminated, the film thickness becomes thick and it is not practical, it is preferable for the optically anisotropic layer 13 to be 2 layers or more, and 20 layers or less. Normally, a lamination of 2 to 5 layers is preferable, and a lamination of 2 to 3 layers is practical.

(Azimuth)

The azimuth can be arbitrarily selected from a range from 0 to 180° (0 to −180°).

(Phase Difference)

The phase difference is determined by the usage object and usage wavelength region of the optical film 10. For example, in a case where it is utilized in the visible region, the phase difference at a wavelength of 540 nm is 240 to 320 µm for a one-half wavelength plate, and 120 to 160 µm for a one-quarter wavelength plate. Although it is acceptable if it becomes larger than this, the film thickness becomes thick. For example, a combination of an optically anisotropic layer 13 in which the phase difference measured at 540 nm is 240 to 300 nm, and an optically anisotropic layer 13 in which it is 120 to 150 nm, is preferable.

The phase difference is, for example, measurable by an automatic double refraction meter, or the like.

(Accuracy of Controlling the Optical Axis of the Plurality of Optically Anisotropic Layers 13)

By laminating the optically anisotropic layer 13 at a specific angle, a variety of optical functions can be expressed. This lamination angle can be calculated by a calculation based on a theoretical formula. Many lamination structures have already been proposed.

The method of combining the inclination angle and phase difference with respect to the incident light of the wavelength plate is explained using a Poincare sphere, which is often used as a display method of polarized light. The vibration direction of the incident polarized light is changed by placing a suitable retardation plate (first retardation plate) that corresponds to a half-wavelength plate with respect to the incident polarized light, and the polarization state is moved onto an arbitrary equator on a Poincare sphere (first polarization state). However, the incident light contains component light of a wavelength that is shifted from the one-half wavelength condition, and since they become a wideband by means of the first retardation plate, there is a need to align the polarizing state, which passes through the first retardation plate, with the meridian on which the first polarized state is, or to which the first polarized state is as adjacent as possible.

For this purpose, the first retardation plate may be configured by a single one-half wavelength plate, or it may be configured by a plurality of one-half wavelength plates. A plurality of retardation plates possessing phase differences that are different to a one-half wavelength may also be used, and it may be configured by a combination of the same, and one-half wavelength plates.

By passing the light that has been transmitted through the first phase difference plate through a one-quarter wavelength plate and moving the polarized state to the pole on the Poincare sphere, circularly polarized light is obtained. By transmitting through this one-quarter wavelength plate, the difference in phase difference that occurs at the time of transmission through the first retardation plate originating from the wavelength of the incident light is exactly cancelled out, and light of all wavelengths become circularly polarized light of the same polarized state. Stated reversely, in regard to the configuration of the first retardation plate, there is a need for this one-quarter wavelength plate to be combined such that the phase difference for each wavelength following transmission is cancelled out.

Theoretically, since a large difference in the optical function occurs by the obtained set angle deviating by only 1°, there is a need for two optically anisotropic layers 13 to be precisely laminated as per the designed value. In regard to the optical film 10 of the present invention, by arbitrarily changing the irradiation direction of the ultraviolet radiation or the vibration direction of the polarized light in the (step b), it is possible to easily obtain a laminated body of the optically anisotropic layer 13 that is aligned in an arbitrary alignment direction. Specifically, an optical film 10 can be obtained that is laminated such that laminated angle error of the angle created by the mutual slow axes of the optically anisotropic layers 13 is within ±0.1° of the desired angle.

Furthermore, in the case of a liquid crystal display element, in order to bring the angle created by the alignment direction of the liquid crystal compound adjacent to the substrate and the optical axis (slow axis) of the optically anisotropic layer 13 as close as possible to the designed value, specifically, the production method below is performed.

In regard to a specific example of the present invention, an example using a long length film as the substrate is explained here.

1) Production Method of a Wideband One-Quarter Wavelength Plate, in which an Optically Anisotropic Layer 13 Functioning as a One-Half Wavelength Plate, and an Optically Anisotropic Layer 13 Functioning as a One-Quarter Wavelength Plate, are Laminated, and a Wideband Circularly Polarizing Plate, in which the Wideband One-Quarter Wavelength Plate And a Polarizing Plate 20 are Laminated (Step a) The photoaligning polymerizable composition is applied and dried on the long length film.

(Step b) By performing diagonal irradiation of ultraviolet radiation on the layer from a direction that is inclined by exactly an azimuth of 75° (or −105°) with the longitudinal direction of the film as the standard, for example, irradiation inclined by exactly a deflection angle of 45° from the normal direction of the film, a layer (A) 11 having a liquid crystal aligning capability in a direction inclined by exactly an azimuth of 75° from the longitudinal direction of the film is formed. Alternatively, even in a method in which radiation is performed using a polarized ultraviolet radiation irradiation device positioned in the normal direction of the film, such that the vibration direction of the polarized light is inclined by an azimuth of 165° (or −15°) from the longitudinal direction of the film, a layer (A) 11 having a liquid crystal aligning capability in a direction inclined by exactly an azimuth of 75° from the longitudinal direction of the film is formed. At this time, the irradiation direction of the ultraviolet radiation can be arbitrarily selected according to the position and structure of the irradiation device, and completely independently of the transportation direction of the long length film. Furthermore, it is easy to make the precision of the rotation mechanism of the optical system an azimuth of 1.0 to 0.01°.

(Step c) The liquid crystal compound, in which the thickness is controlled such that the phase difference is made one-half wavelength with respect to the wavelength of the incident light, is applied on the obtained layer (A) 11, and is aligned on the layer (A) 11.

(Step d) By polymerizing these two layers at the same time by means of ultraviolet radiation irradiation, the layer (A) 11 and the layer (B) 12 become covalently bonded, and an optically anisotropic layer 13, which functions as a one-half wavelength plate where the slow axis is inclined by exactly an azimuth of 75° from the film longitudinal direction, can be prepared.

Next, on top of the obtained optically anisotropic layer 13, the (step a) to the (step d) is repeated continuously. At this time, the irradiation direction of the ultraviolet radiation in the (step b) is made a diagonal irradiation from a direction that is inclined by exactly an azimuth of 15° (or −165°) with the longitudinal direction of the film as the standard, for example, irradiation that is inclined by a deflection angle of 45° from the normal direction of the film. By making it in such a manner, a layer (A) 11 that has a liquid crystal aligning capability that is inclined by an azimuth of 15° from the longitudinal direction of the film can be formed. Alternatively, even if irradiation is performed using a polarized ultraviolet radiation irradiation device positioned in the normal direction of the film, such that the vibration direction of the polarized light is inclined by an azimuth of 105° (or −75°) from the longitudinal direction of the film, a layer (A) 11 having a liquid crystal aligning capability in a direction inclined by exactly an azimuth of 15° from the longitudinal direction of the film can be formed. Furthermore, the film thickness of the polymerizable liquid crystal composition layer in the (step c) is set to make the optically anisotropic layer 13 in which the phase difference functions as a one-quarter wavelength with respect to the wavelength of the aforementioned incident light. Consequently, a wideband one-quarter wavelength plate can be easily prepared.

By laminating the wideband one-quarter wavelength plate and the long length polarizing plate 20, in which the absorption axis is the longitudinal direction, such that the longitudinal directions are lined up, a wideband circularly polarizing plate can easily be made.

2) Production Method of a Wideband One-Quarter Wavelength Plate, in which Two Optically Anisotropic Layers 13 that Function as One-Half Wavelength Plates, and an Optically Anisotropic Layer 13 that Functions as a One-Quarter Wavelength Plate, is Laminated, and a Wideband Circularly Polarizing Plate, in which the Wideband One-Quarter Wavelength Plate And the Polarizing Plate 20 are Laminated In regard to the irradiation direction of the ultraviolet light of the first (step b), the slow axis is made an azimuth of 176° (or −4°) from the longitudinal direction of the film, and the film thickness of the polymerizable liquid crystal composition layer in the (step c) is made such that the phase difference at the wavelength of the aforementioned incident light becomes one-half wavelength. In regard to the irradiation direction of the ultraviolet light of the second (step b), the slow axis is made an azimuth of 154° (or −26°) from the longitudinal direction of the film, and the film thickness of the polymerizable liquid crystal composition layer in the (step c) is made such that the phase difference at the wavelength of the aforementioned incident light becomes one-half wavelength. In regard to the irradiation direction of the ultraviolet light of the third (step b), the slow axis is made an azimuth of 91° (or −89°) from the longitudinal direction of the film, and the film thickness of the polymerizable liquid crystal composition layer in the (step c) is made such that the phase difference at the wavelength of the aforementioned incident light becomes one-half wavelength. By laminating the optically anisotropic layer 13 in this manner, a wideband one-quarter wavelength plate can be easily prepared, and by laminating the wideband one-quarter wavelength plate and the long length polarizing plate 20, in which the absorption axis is the longitudinal direction, such that the longitudinal directions are matched, it can be easily made a wideband circularly polarizing plate.

(Optically Isotropic Resin Layer)

Figure 3:
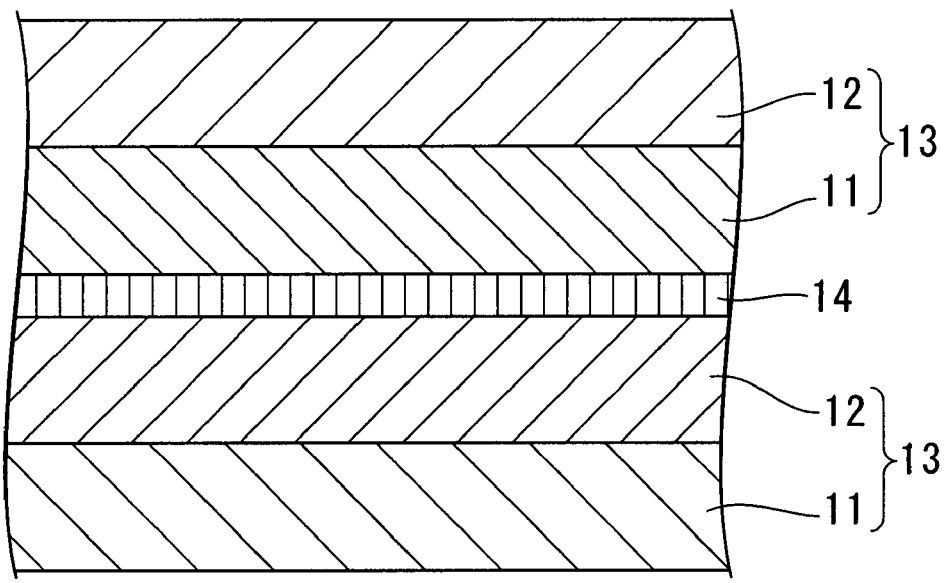
FIG. 3 is a cross-sectional view of one example of the optical film of the present invention containing an optically isotropic resin layer.

In the present invention, the lamination of the optically anisotropic layer 13 is achieved by repeating the process (I) as described above, a plurality of times. On the other hand, depending on the surface state of the substrate and the surface state of the layer that is laminated on the substrate, an optically isotropic resin layer may be provided between the two adjacent optically anisotropic layers 13. An example of an optical film 10 containing an optically isotropic resin layer is shown in FIG. 3. In FIG. 3, reference symbol 14 represents the optically isotropic resin layer.

There are no particular restrictions on the material of the optically isotropic resin layer 14, although thermoplastic resins, such as acrylic resins and polyvinyl alcohol, and polymerizable resins that utilize photopolymerizable resins, such as acrylic monomers, or heat polymerizable resins, such as epoxy monomers, can be utilized. Amongst these, if the surface smoothness of the optically isotropic resin layer 14 following application is considered, polymer compounds that form high viscosity coating liquids, or high viscosity monomers, are desirable, and it is desirable for the viscosity to be 200 to 20000 Pa·sec, and it is more desirable for it to be 500 to 20000 Pa·sec.

There are no restrictions on the thickness of the optically isotropic resin layer 14 as long as it achieves the objects mentioned above, although if industrial application is considered, since thinning and lightening is desired, it is desirable for the thickness to be 0.01 to 30 μm, and it is more desirable for it to be 0.01 to 10 μm.

The optically isotropic resin layer 14 can, by means of the application method, be directly provided by applying and drying an optically isotropic resin on the optically anisotropic layer 13. Furthermore, polymerization by means of photoirradiation or heat may be performed as necessary.

By providing the optically isotropic resin layer 14 between the optically anisotropic layers 13 in which adjacent layer (A) 11 and layer (B) 12 are bonded by covalent bonding, the adhesion properties between layers or the flatness of the surface of the layer may be improved. Furthermore, an optical film 10 can be prepared such that effects are not exerted on the different alignment directions possessed by adjacent optically anisotropic layers 13. That is to say, since the exertion of effects on the surface alignment of the first layer (B) 12 and the surface state of the second layer (A) 11 can be avoided, the ellipticity of the circularly polarizing plate is increased, and the wavelength dependency of the elliptically polarizing plate can be decreased. Furthermore, interfacial reflections, which originate from differences in the refraction index between layers that have anisotropy, can be avoided.

Figure 4:
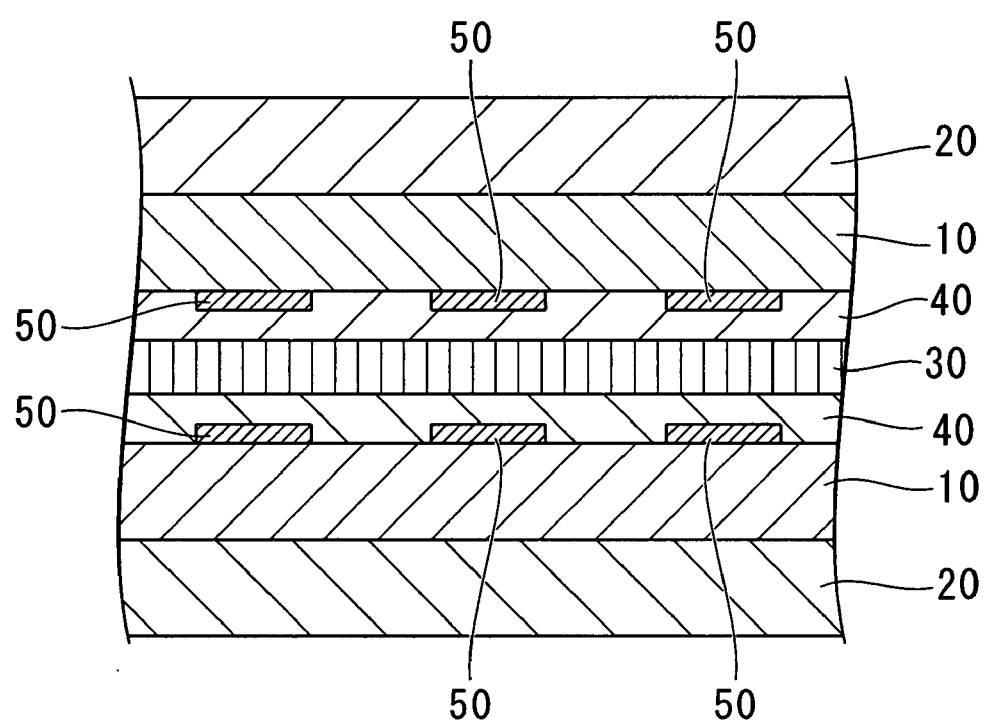
FIG. 4 is a cross-sectional view of one example of a liquid crystal display element using the optical film of the present invention.

Using the optical film 10 of the present invention, it is possible to prepare a liquid crystal display element. An example of this liquid crystal display element is shown in FIG. 4. In FIG. 4, reference symbols 30, 40, and 50 respectively represent a liquid crystal layer, an alignment film, and a pixel electrode.

EXAMPLES

Polarizing Plate 20

In regard to the obtained optical film 10, by laminating a suitable polarizing plate 20, such as a linearly polarizing plate, the elliptically polarizing plate and the circularly polarizing plate can be formed. There are no particular restrictions on the polarizing plate 20, although it can be combined with polarizing films, such as iodine systems and dye systems, or polarizing prisms, such as a Glan-Thompson prism or a Glan-Taylor prism.

(Preparation of the Photoaligning Polymerizable Composition A-1)

A compound represented by formula (1) was dissolved in a mixed solvent comprising 2-butoxyethanol, 1-butanol, water, and ethanol, and it was made a 1 weight % solid content solution. This solution was filtered through a filter with a pore size of 0.1 μm, and it was made the photoaligning polymerizable composition solution (A-1).

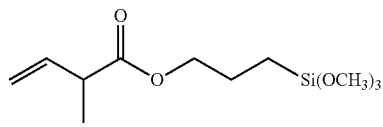

(3)

(Preparation of the Photoaligning Polymerizable Composition A-3)

A compound represented by formula (2) was dissolved in a mixed solvent comprising 2-butoxyethanol, 1-butanol, water, and ethanol, and it was made a 2 weight % solution. This solution was filtered through a filter with a pore size of 0.1 μm, and it was made the photoaligning polymerizable composition solution (A-3).

(Preparation of the Photoaligning Polymerizable Composition A-4)

Polyvinylcinnamate (manufactured by Aldrich Co., molecular weight: 200,000) was dissolved in a solvent comprising NMP and 2-butoxyethanol, and it was made a 1 weight % solid content concentration solution. This was made the photoaligning polymerizable composition (A-4).

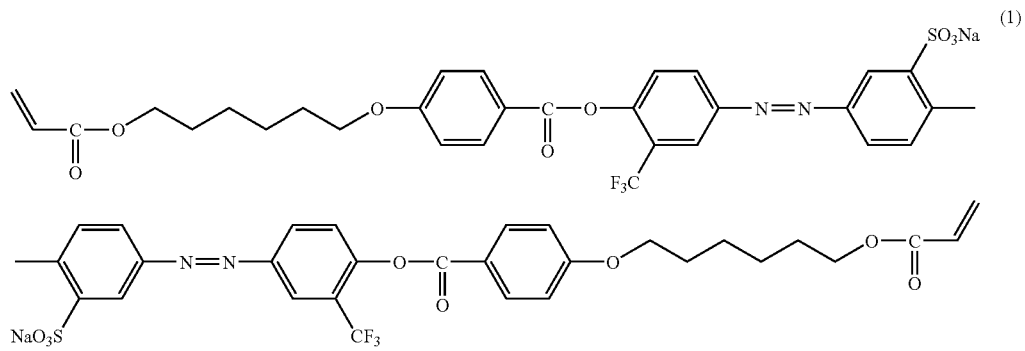

(1)

(Preparation of the Photoaligning Polymerizable Composition A-2)

40 parts by mass of a compound represented by formula (2), and 60 parts by mass of a compound represented by formula (3) were each mixed and dissolved in a mixed solvent comprising 2-butoxyethanol, 1-butanol, water, and ethanol, and it was made a 2-weight % solution. This solution was filtered through a filter with a pore size of 0.1 μm, and it was made the photoaligning polymerizable composition solution (A-2).

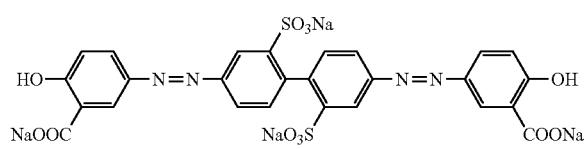

(2)

(Preparation of the Polymerizable Liquid Crystal Composition)

The polymerizable liquid crystal composition was prepared by mixing the compounds represented by the formulas (4), (5), (6), (7), and (8) such that the mass ratios respectively became 22:18:33:22:5, and to this, an additive (9) with mass average molecular weight of 47000 was mixed therein at 0.5 parts by mass with respect to 100 parts by mass of the polymerizable liquid crystal composition. Next, it was filtered through a filter with a pore size of 0.1 μm. To 96 parts of this polymerizable liquid crystal composition, 4 parts of the photoinitiator "Irgacure 907" manufactured by Ciba Specialty Chemicals K.K., and 100 parts of xylene were mixed, and this was made the polymerizable liquid crystal composition solution (B-1). The liquid crystal composition following evaporation of the xylene from the polymerizable liquid crystal composition solution (B-1) exhibited a liquid crystal phase at 25° C. Consequently, in the examples below, the liquid crystal composition was used at 25° C.

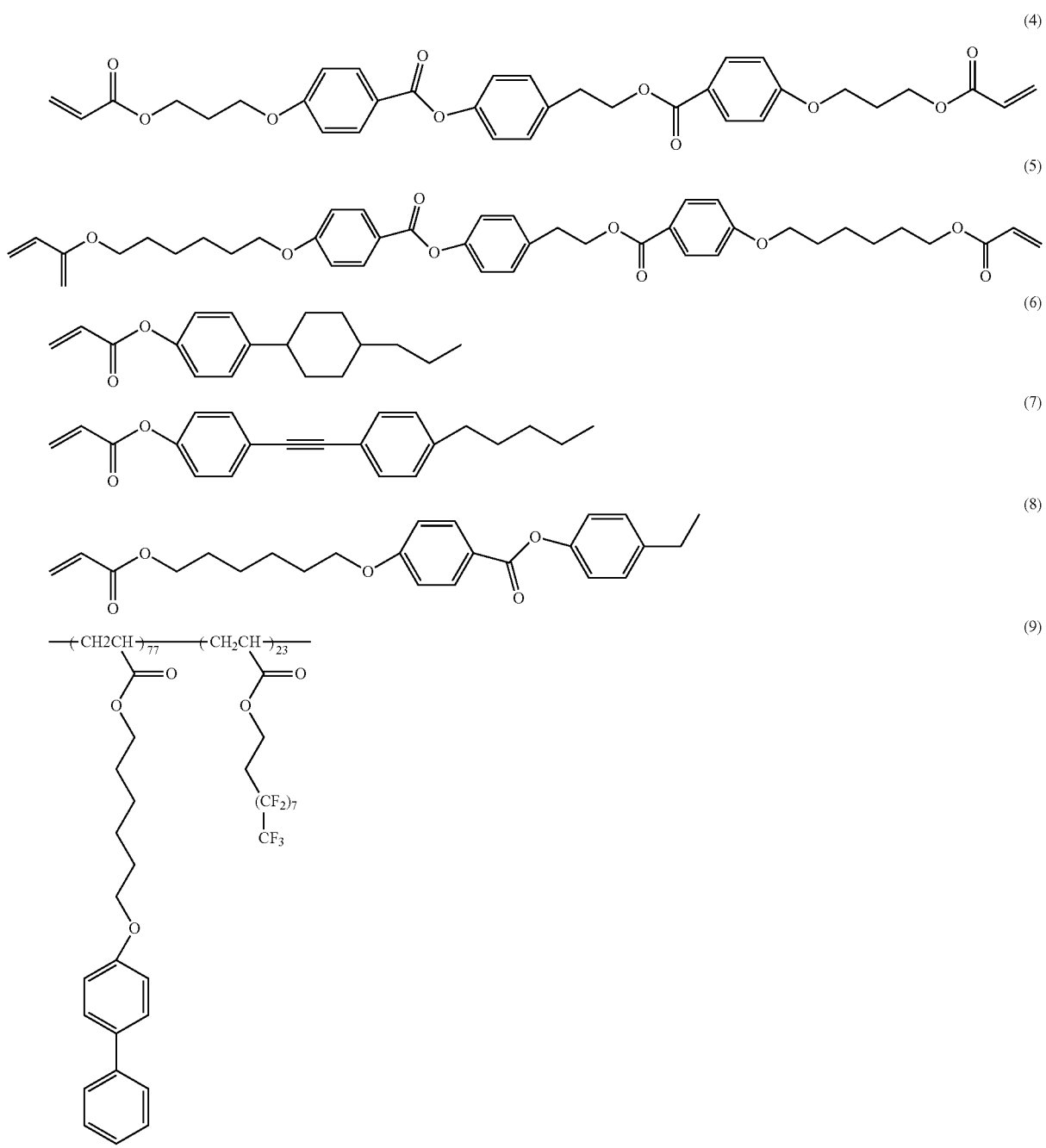

The optical films 10 obtained in the examples described below were measured by the evaluation methods described below, and the results are shown in Table 1.

The phase difference was measured at a wavelength of 540 nm using an automatic birefringence analyzer (KOBRA 21 ADH (manufactured by Oji Scientific Instruments)). The chromatic dispersion of the ellipticity of the circularly polarizing plates was measured at wavelengths of 477.8 nm, 545.7 nm, and 628.6 nm, using an automatic birefringence analyzer (KOBRA 21 ADH (manufactured by Oji Scientific Instruments)). Furthermore, in regard to the adhesive strength between the optical film 10 formed on a triacetylcellulose (TAC) film and the TAC film, square grid-shaped cuts with 1 mm sides were inserted into the prepared phase difference film by a cutter, cellotape (registered trademark) was laminated and raised in the perpendicular direction, and the proportion of the number of square grids of the optical film 10 that remained was calculated. The defects generated within the film were evaluated under Cross-Nicol conditions by polarizing microscope observation by counting the number of points in which light transits, and are shown in Table 1. The accuracy and reproducibility of the lamination angle of the optical film 10 was estimated from the value of the ellipticity measurements of a plurality of samples. The effective utilization ratios of the optical films 10 were determined by the area of the optical film 10 that had to be disposed of as a result of cutting out.

Example 1

Following corona processing of the TAC film, the photoaligning polymerizable composition solution (A-1) was spin coated, and a layer of a film thickness of 20 nm was formed. After this had been dried at 80° C., 365 nm ultraviolet radiation that had been passed through a bandpass filter was irradiated for 500 seconds from a direction inclined by 45° with respect to the layer face at an intensity of 2 mW/cm$^2$ in order to perform the alignment process, and the layer (A) 11 was formed. The azimuth exhibited by the projection of this irradiated light towards the layer was defined as 0°. A polymerizable liquid crystal composition solution (B-1) was spin coated on the layer (A) 11, and following drying at 80° C., 640 mJ/cm$^2$ of ultraviolet radiation was irradiated under a nitrogen atmosphere, and an optically anisotropic layer 13, in which the phase difference measured at a wavelength of 540 nm was 270 nm, was obtained. Next, following corona processing of this surface, a 5 wt % aqueous solution of polyvinyl alcohol (PVA) was spin coated, dried at 80° C., and an optically isotropic resin layer 14 was provided.

Under the same conditions as mentioned above other than making the azimuth 60°, and the phase difference 135 nm, a photoaligning polymerizable composition solution (A-1) and a polymerizable liquid crystal composition solution (B-1) was applied thereon. This was bonded on the polarizing plate such that the TAC face became the laminating face, and it was made a circularly polarizing plate. As the lamination angle, the angle between the absorption axis of the polarizing plate 20 and the slow axis of the wavelength plate with a phase difference of 270 nm was 75°, and the angle between the absorption axis and the slow axis of the wavelength plate with a phase difference of 135 nm was 15°.

Example 2

Following corona processing of a polarizing plate 20 comprising PVA, in which iodine has been impregnated, and TAC, the photoaligning polymerizable composition solution (A-1) was spin coated, and a layer of a film thickness of 20 nm was formed. After this had been dried at 80° C., 365 nm ultraviolet radiation that had been passed through a bandpass filter was irradiated for 500 seconds from a direction inclined by 45° with respect to the layer face at an intensity of 2 mW/cm$^2$ in order to perform the alignment process, and the layer (A) 11 was formed. The azimuth exhibited by the projection of this irradiated light towards the layer (A) 11 is defined as 0°. A polymerizable liquid crystal composition solution (B-1) was spin coated on the layer (A) 11, and following drying at 80° C., 640 mJ/cm$^2$ of ultraviolet radiation was irradiated under a nitrogen atmosphere, and an optically anisotropic layer 13, in which the phase difference measured at a wavelength of 540 nm was 270 nm, was obtained. Next, following corona processing of this surface, a 5 wt % aqueous solution of PVA was spin coated, dried at 80° C., and an optically isotropic resin layer 14 was provided.

Other than making the azimuth 60°, and the phase difference 135 nm, a photoaligning polymerizable composition solution (A-1) and a polymerizable liquid crystal composition solution (B-1) was applied thereon under the same conditions as mentioned above. As the lamination angle, the angle between the absorption axis of the polarizing plate 20 and the slow axis of the wavelength plate with a phase difference of 270 nm was 75°, and the angle between the absorption axis and the slow axis of the wavelength plate with a phase difference of 135 nm was 15°.

Example 3

Following corona processing of the TAC film, the photoaligning polymerizable composition solution (A-2) was spin coated, and a layer of a film thickness of 20 nm was formed. After this had been dried at 80° C., 365 nm ultraviolet radiation that had been passed through a bandpass filter was irradiated for 500 seconds from a direction inclined by 45° with respect to the layer face at an intensity of 2 mW/cm$^2$ in order to perform the alignment process, and the layer (A) 11 was formed. The azimuth exhibited by the projection of this irradiated light towards the layer (A) 11 is defined as 0°. A polymerizable liquid crystal composition solution (B-1) was spin coated on the layer (A) 11, and following drying at 80° C., 640 mJ/cm$^2$ of ultraviolet radiation was irradiated under a nitrogen atmosphere, and an optically anisotropic layer 13, in which the phase difference measured at a wavelength of 540 nm was 270 nm, was obtained. Next, following corona processing of this surface, a 5 wt % aqueous solution of PVA was spin coated, dried at 80° C., and an optically isotropic resin layer 14 was provided.

Other than making the azimuth 60°, and the phase difference 135 nm, a photoaligning polymerizable composition solution (A-2) and a polymerizable liquid crystal composition solution (B-1) was applied thereon under the same conditions as mentioned above. This was bonded on the polarizing plate such that the TAC face became the laminating face, and it was made a circularly polarizing plate. As the lamination angle, the angle between the absorption axis of the polarizing plate 20 and the slow axis of the wavelength plate with a phase difference of 270 nm was 75°, and the angle between the absorption axis and the slow axis of the wavelength plate with a phase difference of 135 nm was 15°.

Example 4

Following corona processing of the TAC film, the photoaligning polymerizable composition solution (A-1) was spin coated, and a layer of a film thickness of 20 nm was formed. After this had been dried at 80° C., 365 nm ultraviolet radiation that had been passed through a bandpass filter was irradiated for 500 seconds from a direction inclined by 45° with respect to the layer face at an intensity of 2 mW/cm$^2$ in order to perform the alignment process, and the layer (A) 11 was formed. The azimuth exhibited by the projection of this irradiated light towards the layer (A) 11 is defined as 0°. A polymerizable liquid crystal composition solution (B-1) was spin coated on the layer (A) 11, and following drying at 80° C., 640 mJ/cm$^2$ of ultraviolet radiation was irradiated under a nitrogen atmosphere, and an optically anisotropic layer 13, in which the phase difference measured at a wavelength of 540 nm was 270 nm, was obtained. Next, following corona processing of this surface, other than making the azimuth 60°, and the phase difference 135 nm, a photoaligning polymerizable composition solution (A-1) and a polymerizable liquid crystal composition solution (B-1) was applied thereon under the same conditions as mentioned above. This was bonded on the polarizing plate such that the TAC face became the laminating face, and it was made a circularly polarizing plate. As the lamination angle, the angle between the absorption axis of the polarizing plate 20 and the slow axis of the wavelength plate with a phase difference of 270 nm was 75°, and the angle between the absorption axis and the slow axis of the wavelength plate with a phase difference of 135 nm was 15°.

Example 5

Following corona processing of the TAC film, a photoaligning polymerizable composition solution (A-1) was continuously deposited using a microgravure coater, and a layer of a film thickness of 20 nm was formed. After this had been dried at 80° C., 4 J/cm² of 365 nm polarized ultraviolet radiation that had been passed through a bandpass filter was irradiated from the normal direction of the layer face in order to perform the alignment process, and the layer (A) 11 was formed. At this time, the vibration direction of the irradiated polarized light was made a direction that was inclined by 15° with respect to the longitudinal direction of the film. A polymerizable liquid crystal composition solution (B-1) was applied on the layer (A) 11 using a microgravure coater, and following drying at 80° C., 640 mJ/cm² of ultraviolet radiation was irradiated under a nitrogen atmosphere, and an optically anisotropic layer 13, in which the phase difference measured at a wavelength of 540 nm was 270 nm, and the azimuth of the slow axis with respect to the longitudinal direction of the film was 75°, was obtained. Next, following corona processing of this surface, other than making the azimuth 15°, and the phase difference 135 nm, a photoaligning polymerizable composition solution (A-1) and a polymerizable liquid crystal composition solution (B-1) was applied thereon under the same conditions as mentioned above. This was bonded on the polarizing plate such that the TAC face became the laminating face, and it was made a circularly polarizing plate. As the lamination angle, the angle between the absorption axis of the polarizing plate 20 and the slow axis of the wavelength plate with a phase difference of 270 nm was 75°, and the angle between the absorption axis and the slow axis of the wavelength plate with a phase difference of 135 nm was 15°.

Example 6

Following corona processing of the TAC film, a photoaligning polymerizable composition solution (A-1) was continuously deposited using a microgravure coater, and a layer of a film thickness of 20 nm was formed. After this had been dried at 80° C., 4 J/cm² of 365 nm polarized ultraviolet radiation that had been passed through a bandpass filter was irradiated from the normal direction of the layer face in order to perform the alignment process, and the layer (A) 11 was formed. At this time, the vibration direction of the irradiated polarized light was made a direction that was inclined by 15° with respect to the longitudinal direction of the film. A polymerizable liquid crystal composition solution (B-1) was applied on the layer (A) 11 using a microgravure coater, and following drying at 80° C., 640 mJ/cm² of ultraviolet radiation was irradiated under a nitrogen atmosphere, and an optically anisotropic layer 13, in which the phase difference measured at a wavelength of 540 nm was 135 nm, and the azimuth of the slow axis with respect to the longitudinal direction of the film was 75°, was obtained. Next, following corona processing of this surface, the same process was repeated one more time, an anisotropic layer with an azimuth of 75° and a phase difference of 135 nm was laminated, and together with the anisotropic layer that was previously laminated, an anisotropic layer with an azimuth of 75° and a phase difference of 270 nm was obtained. Next, following corona processing of this surface, other than making the azimuth 15°, and the phase difference 135 nm, a photoaligning polymerizable composition solution (A-1) and a polymerizable liquid crystal composition solution (B-1) was applied thereon under the same conditions as mentioned above. This was bonded on the polarizing plate such that the TAC face became the laminating face, and it was made a circularly polarizing plate. As the lamination angle, the angle between the absorption axis of the polarizing plate 20 and the slow axis of the wavelength plate with a phase difference of 270 nm was 75°, and the angle between the absorption axis and the slow axis of the wavelength plate with a phase difference of 135 nm was 15°.

Comparative Example 1

Following corona processing of the TAC film, a 2-butoxyethanol solution (concentration: 30 wt %, hereunder referred to as the rubbing alignment film solution (C)) of a phenol novolac type epoxy acrylate manufactured by Dainippon Ink and Chemicals, Inc., which had an acrylic group on the sidechain, was applied by spin coating, and was dried for 30 minutes at 60° C. To this, rubbing processing was performed, and the polymerizable liquid crystal composition solution (B-1) was spin coated on this aligned layer. Following drying at 80° C., 640 mJ/cm² of ultraviolet radiation was irradiated under a nitrogen atmosphere, and an optically anisotropic layer 13, in which the phase difference measured at a wavelength of 540 nm was 270 nm, was obtained.

In the same manner as the method mentioned above, an optically anisotropic layer 13 was obtained by controlling the film thickness of a separate TAC film such that the phase difference becomes 135 nm. In order to laminate these two types of wavelength plates on the polarizing plate 20, they were laminated via an adhesive after the cutting out of a rectangular wavelength plate such that the shape of the polarizing plate 20 was matched. At that time, the original material that was cut had to be disposed. Furthermore, as the target lamination angle, the angle between the absorption axis of the polarizing plate 20 and the slow axis of the 270 nm wavelength plate was 75°, and the angle between the slow axis of the 135 nm wavelength plate was 15°. Then, although laminating was attempted to be performed by matching one side of the film, there was difficulty in cutting such that the direction of the slow axis was matched with the one side of the film, and there was also difficulty in accurately performing the angle adjustment of the two films by matching the one side of the film. The wavelength distribution of the ellipticity of this circularly polarizing plate was measured by an automatic double refraction meter, and the highest ellipticity amongst the repetitions of the experiment are disclosed in Table 1, although the disparities between samples became considerably large. Furthermore, in estimating the ellipticity of the obtained circularly polarizing plates, the reproducibility of the lamination angle was poor, and it is thought that the actual angle is a value that is deviated from these values.

Comparative Example 2

Following corona processing of the TAC film, the photoaligning polymerizable composition solution (A-3) was spin coated, and a layer of a film thickness of 20 nm was formed. After this had been dried at 80° C., 365 nm ultraviolet radiation that had been passed through a bandpass filter was irradiated for 500 seconds from a direction inclined by 45° with respect to the layer face at an intensity of 2 mW/cm² in order to perform the alignment process, and the photoalignment layer was prepared. The azimuth exhibited by the projection of this irradiated light towards the photoalignment layer is defined as 0°. A polymerizable liquid crystal composition solution (B-1) was spin coated on the photoalignment layer, and following drying at 80° C., 640 mJ/cm² of ultraviolet radiation was irradiated under a nitrogen atmosphere, and an optically anisotropic layer 13, in which the phase difference measured at a wavelength of 540 nm was 270 nm, was obtained. Next, following corona processing of this surface, a 5 wt % aqueous solution of PVA was spin coated, dried at 80° C., and an optically isotropic resin layer 14 was provided.

Other than making the azimuth 60°, and the phase difference 135 nm, a photoaligning polymerizable composition solution (A-3) and a polymerizable liquid crystal composition solution (B-1) was applied thereon under the same conditions as mentioned above. This was bonded on the polarizing plate such that the TAC face became the laminating face, and it was made a circularly polarizing plate. As the lamination angle, the angle between the absorption axis of the polarizing plate 20 and the slow axis of the wavelength plate with a phase difference of 270 nm was 75°, and the angle between the absorption axis and the slow axis of the wavelength plate with a phase difference of 135 nm was 15°.

The above results are summarized in Table 1.

TABLE 1

|  | Ellipticity | | | Number of square grids | | Area of | |
| --- | --- | --- | --- | --- | --- | --- | --- |
|  | Measurement Wavelength 477.8 nm | Measurement Wavelength 545.7 nm | Measurement Wavelength 628.6 nm | remaining following peel testing (%) | Reproducibility of Lamination Angle | Wavelength Plate Utilized | Amount of Defects in Film |
| Example 1 | 0.94 | 0.99 | 0.96 | 95 | Satisfactory | Large | Small |
| Example 2 | 0.94 | 0.99 | 0.96 | 95 | Satisfactory | Large | Small |
| Example 3 | 0.91 | 0.98 | 0.93 | 99 | Satisfactory | Large | Small |
| Example 4 | 0.93 | 0.99 | 0.95 | 95 | Satisfactory | Large | Large |
| Example 5 | 0.93 | 0.99 | 0.95 | 95 | Satisfactory | Large | Moderate |
| Example 6 | 0.93 | 0.99 | 0.95 | 95 | Satisfactory | Large | Moderate |
| Comparative Example 1 | 0.87 | 0.95 | 0.90 | 95 | Unsatisfactory | Small | Small |
| Comparative Example 2 | 0.94 | 0.99 | 0.96 | 0 | Satisfactory | Large | Small |

With respect to Examples 1 to 6, as a result of the difference between the measured values of the obtained ellipticity and the calculated values of the ellipticity obtained through calculations, it was understood that the error in the lamination angle was within 0.1°. On the other hand, in Comparative Example 1, a lamination angle error exceeding 0.1° was observed.

Furthermore, in Comparative Example 2, since the photoalignment layer and the polymer layer were not bonded by covalent bonding, the peel strength was not sufficient.

Evaluation of the Transmitted Light Intensity

Example 7

The photoaligning polymerizable composition solution (A-1) (this was the photoaligning polymerizable composition utilized in Example 1) was spin coated on a glass substrate, and a layer of a film thickness of 20 nm was formed. Following drying at 80° C., the photoalignment operation was performed by irradiating 365 nm ultraviolet radiation that had been passed through a bandpass filter for 500 seconds from a direction inclined by 45° with respect to the layer face at an intensity of 2 mW/cm², and the layer (A) 11 was formed. The azimuth exhibited by the projection of this irradiated light towards the layer is defined as 0°. A polymerizable liquid crystal composition solution (B-1) was spin coated on the layer (A) 11, and following drying at 80° C., 640 mJ/cm² of ultraviolet radiation was irradiated under a nitrogen atmosphere, and an optically anisotropic layer 13, in which the phase difference measured at a wavelength of 540 nm was 270 nm, was obtained. Next, following corona processing of the surface, a 5 wt % aqueous solution of polyvinyl alcohol (PVA) was spin coated, dried at 80° C., and an optically isotropic resin layer 14 was provided.

Other than making the azimuth 60°, and the phase difference 135 nm, a photoaligning polymerizable composition solution (A-1) and a polymerizable liquid crystal composition solution (B-1) was applied thereon under the same conditions as mentioned above, and an optical film 10, in which the optically anisotropic layer 13 was laminated, was obtained.

Comparative Example 3

The photoaligning polymerizable composition solution (A-4) was spin coated on a glass substrate, and following drying for 2 minutes at 100° C., the photoalignment operation was performed by irradiating 5 J/cm² of 313 nm ultraviolet radiation that had been passed through a bandpass filter, and the layer (A) 11 was formed. The azimuth of the vibration direction of the irradiated polarized light is defined as 0°. A polymerizable liquid crystal composition solution (B-1) was spin coated on the layer (A) 11, and following drying at 80° C., 640 mJ/cm² of ultraviolet radiation was irradiated under a nitrogen atmosphere, and an optically anisotropic layer 13, in which the phase difference measured at a wavelength of 540 nm was 270 nm, was obtained. Next, following corona processing of this surface, a 5 wt % aqueous solution of PVA was spin coated, dried at 80° C., and an optically isotropic resin layer 14 was provided. Other than making the azimuth 60°, and the phase difference 135 nm, a photoaligning polymerizable composition solution (A-4) and a polymerizable liquid crystal composition solution (B-1) was applied thereon under the same conditions as mentioned above, and an optical film 10, in which the optically anisotropic layer 13 was laminated, was obtained.

Comparative Example 4

The optical film 10, in which an optically anisotropic layer 13 is laminated, that utilizes the rubbing alignment film solution (C), was obtained on the glass substrate by the same method as Comparative Example 1.

Comparative Example 5

The optical film 10, in which an optically anisotropic layer 13 is laminated, that utilizes the photoaligning polymerizable composition solution (A-3), was obtained on the glass substrate by the same method as Comparative Example 2.

(Measurement Method of the Transmitted Light Intensity)

In regard to the transmitted light intensity, the light transmittance was measured using an automatic birefringence analyzer (KOBRA 21 ADH (manufactured by Oji Scientific Instruments)), and the transmitted light intensity was represented by the ratio of the transmitted light intensity in a direction, which was inclined by 50° from the normal, to the transmitted light intensity in the normal direction of the film.

The results are shown in Table 2.

TABLE 2

|  | Transmitted Light Intensity Ratio (50°/0°) |
|---|---|
| Example 7 | 73.8% |
| Example 8 | 71.1% |
| Comparative Example 3 | 67.7% |
| Comparative Example 4 | 74.0% |

Example 7 is an example in which a low molecular weight compound represented by the general formula (1) was utilized as the photoalignment film composition, and the transmitted light intensity ratio exhibits a high value of 73.8%. Comparative Example 3 is an example in which polyvinylcinnamate with a molecular weight of 200,000 was utilized as the photoalignment film composition, and although the transmitted light intensity ratio is comparatively high, compared to a case where the low molecular weight photoalignment film was utilized, it is low and not sufficient.

Comparative Example 4 is an example in which a rubbing resin polymer was utilized as the alignment film composition, and the transmitted light intensity ratio is the lowest. Comparative Example 5 is an example in which a low molecular weight compound represented by the general formula (2) is utilized, and the transmitted light intensity ratio is excellent.

From the results of Table 1 and Table 2, in the optical film 10 described in Example, lamination was able to be precisely performed with an optical axis positional relationship (lamination angle) as per the design; the durability was excellent in that there was no peeling at the interface between the photoalignment film and the polymerizable liquid crystal layer, or the like; and the transmitted light intensity ratio was also excellent.

INDUSTRIAL APPLICABILITY

The optical film 10, and circularly polarizing plates and elliptically polarizing plates in which the optical film 10 and the polarizing plate 20 are laminated, are not restricted to reflection type liquid crystal display devices, and they may also be utilized as reflection preventing films that suppress the reflections at the surface. These may be applied in touch panels, electroluminescence (EL) displays, reflection type projectors, or the like.

The invention claimed is:

1. An optical film comprising a plurality of optically anisotropic layers which are laminated, wherein the optically anisotropic layer comprises:
    a photoalignment layer (A) in which a liquid crystal aligning capability has been generated by means of photoirradiation; and
    a polymer layer (B), which contains a liquid crystal compound that has a polymerizable group, and which is obtained by polymerization in a state where it has been aligned by the photoalignment layer (A), wherein
    the photoalignment layer (A) and the polymer layer (B) are bonded by covalent bonding, and
    said photoalignment layer (A) contains a dichromatic dye that has a polymerizable group, whose mass average molecular weight is $1 \times 10^2$ to $5 \times 10^3$; or a dichromatic dye, whose mass average molecular weight is $1 \times 10^2$ to $5 \times 10^3$, and a polymerizable compound whose mass average molecular weight is 50 to 1000.

2. An optical film according to claim 1, further comprising an optically isotropic resin layer between two adjacent optically anisotropic layers.

3. An optical film according to claim 1, wherein
    at least one of said plurality of optically anisotropic layers is a first optically anisotropic layer in which the phase difference measured at a wavelength of 540 nm is 240 to 300 nm, and
    at least one of said plurality of optically anisotropic layers is a second optically anisotropic layer in which the phase difference measured at a wavelength of 540 nm is 120 to 150 nm.

4. An optical film according to claim 1, wherein said optically anisotropic layers are an optically anisotropic layer having a function of a one-half wavelength plate and an optically anisotropic layer having a function of a one-quarter wavelength plate.

5. An optical film according to claim 1, wherein a laminated angle error of said plurality of optically anisotropic layers is within ±0.1°.

6. An optical film according to claim 1, wherein said liquid crystal compound that has a polymerizable group is a rod-shaped liquid crystal compound.

7. An elliptically polarizing plate comprising an optical film according to any one of claim 1 through claim 5 or claim 6, and a polarizing plate.

8. A circularly polarizing plate comprising an optical film according to any one of claim 1 through claim 5 or claim 6, and a polarizing plate.

9. A liquid crystal display element that uses an optical film according to any one of claim 1 through claim 5 or claim 6.

10. An optical film according to claim 1, wherein a laminated angle error of the optically anisotropic layers produced by covalently bonding the photoaligning polymerizable composition layer and the polymerizable liquid crystal composition layer is within ±0.1°.

* * * * *